US010630409B2

(12) United States Patent
Kobayashi

(10) Patent No.: US 10,630,409 B2
(45) Date of Patent: Apr. 21, 2020

(54) SIGNAL PROCESSING DEVICE AND METHOD THEREOF

(71) Applicant: SONY SEMICONDUCTOR SOLUTIONS CORPORATION, Kanagawa (JP)

(72) Inventor: Seiji Kobayashi, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 111 days.

(21) Appl. No.: 15/577,336

(22) PCT Filed: May 25, 2016

(86) PCT No.: PCT/JP2016/065388
§ 371 (c)(1),
(2) Date: Nov. 27, 2017

(87) PCT Pub. No.: WO2016/194719
PCT Pub. Date: Dec. 8, 2016

(65) Prior Publication Data
US 2018/0159648 A1 Jun. 7, 2018

(30) Foreign Application Priority Data
Jun. 5, 2015 (JP) .................................. 2015-114913

(51) Int. Cl.
H04J 3/10 (2006.01)
H04L 1/00 (2006.01)
(Continued)

(52) U.S. Cl.
CPC .............. H04J 3/10 (2013.01); H04J 3/0602 (2013.01); H04L 1/00 (2013.01); H04W 56/001 (2013.01);
(Continued)

(58) Field of Classification Search
CPC .. H04J 3/10; H04J 3/0602; H04L 1/00; H04L 1/0061; H04W 56/001; H04W 74/0808; H04B 1/709
See application file for complete search history.

(56) References Cited

U.S. PATENT DOCUMENTS

2006/0188257 A1* 8/2006 Kim ...................... H04J 3/1694
398/49
2006/0274754 A1* 12/2006 Cho ........................ H04L 12/52
370/392

FOREIGN PATENT DOCUMENTS

JP 2005-223389 A 8/2005
JP 2006-311439 A 11/2006
JP 2008-135889 A 6/2008

OTHER PUBLICATIONS

"On-Ramp Wireless Technology White Paper", On-Ramp Wireless Incorporated, 008-0012-00 Rev. H, Jan. 9, 2013, 37 pages.

(Continued)

Primary Examiner — Melvin C Marcelo
(74) Attorney, Agent, or Firm — Chip Law Group

(57) ABSTRACT

The present technology relates to a signal processing device and a method thereof that inhibits deterioration in reception sensitivity. In a case where a frequency band is vacant on the basis of a result of carrier sense, a data frame is transmitted as a wireless signal in the frequency band, and further, a synchronous frame formed of predetermined information different from that of the data frame is transmitted as a wireless signal in the frequency band in a case where the data frame is transmitted predetermined number of times within first time. In a case where the synchronous frame is detected, the data frame is detected from a reception signal of predetermined time before the synchronous frame.

20 Claims, 21 Drawing Sheets

(51) Int. Cl.
*H04J 3/06* (2006.01)
*H04W 56/00* (2009.01)
H04W 74/08 (2009.01)
H04B 1/709 (2011.01)

(52) U.S. Cl.
CPC ............ *H04B 1/709* (2013.01); *H04L 1/0061* (2013.01); *H04W 74/0808* (2013.01)

(56) References Cited

OTHER PUBLICATIONS

International Search Report and Written Opinion of PCT Application No. PCT/JP2016/065388, dated Aug. 23, 2016, 08 pages of ISRWO.
"On-Ramp Wireless Technology White Paper", On-Ramp Wireless Incorporated, Jan. 9, 2013, 37 pages.

\* cited by examiner

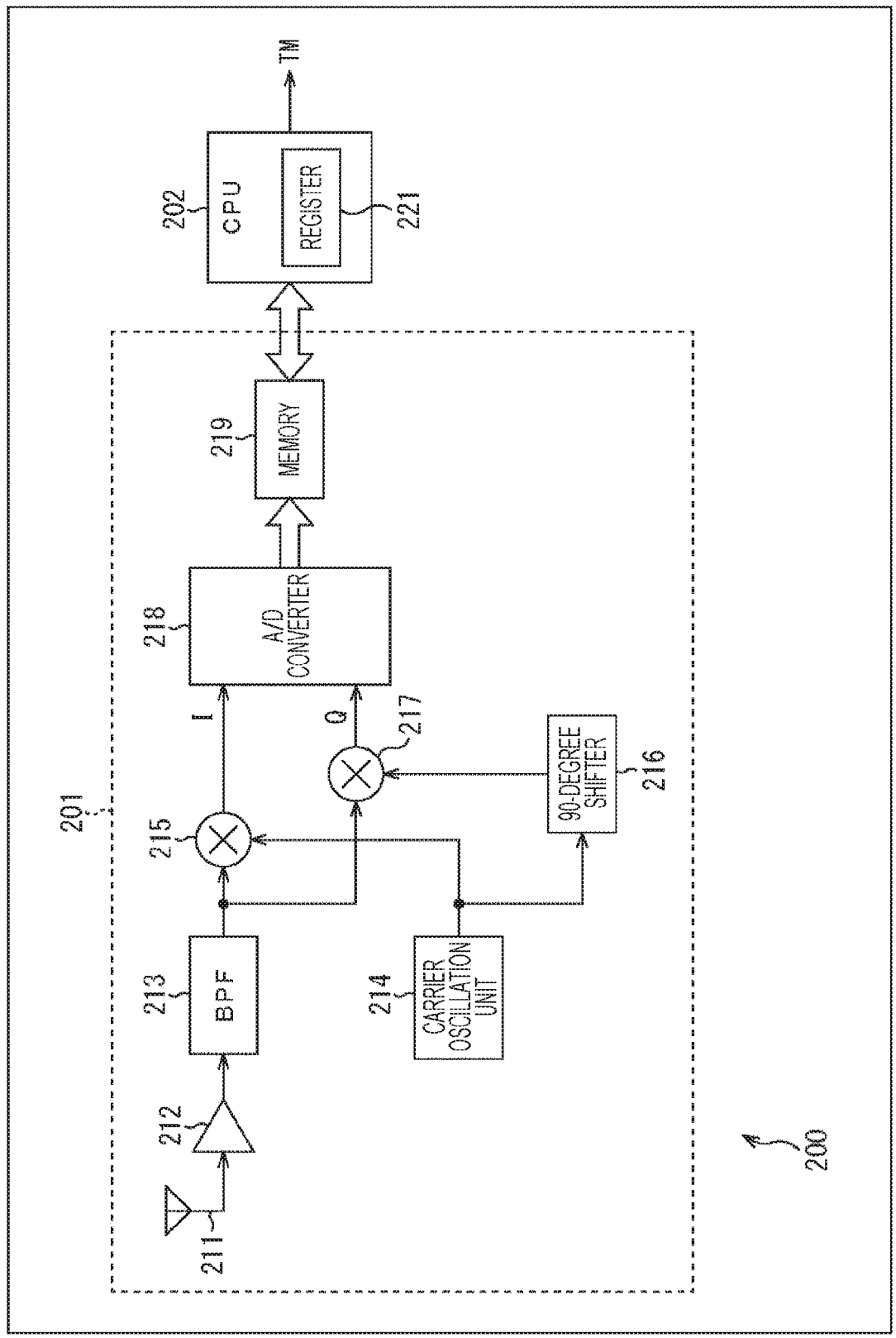

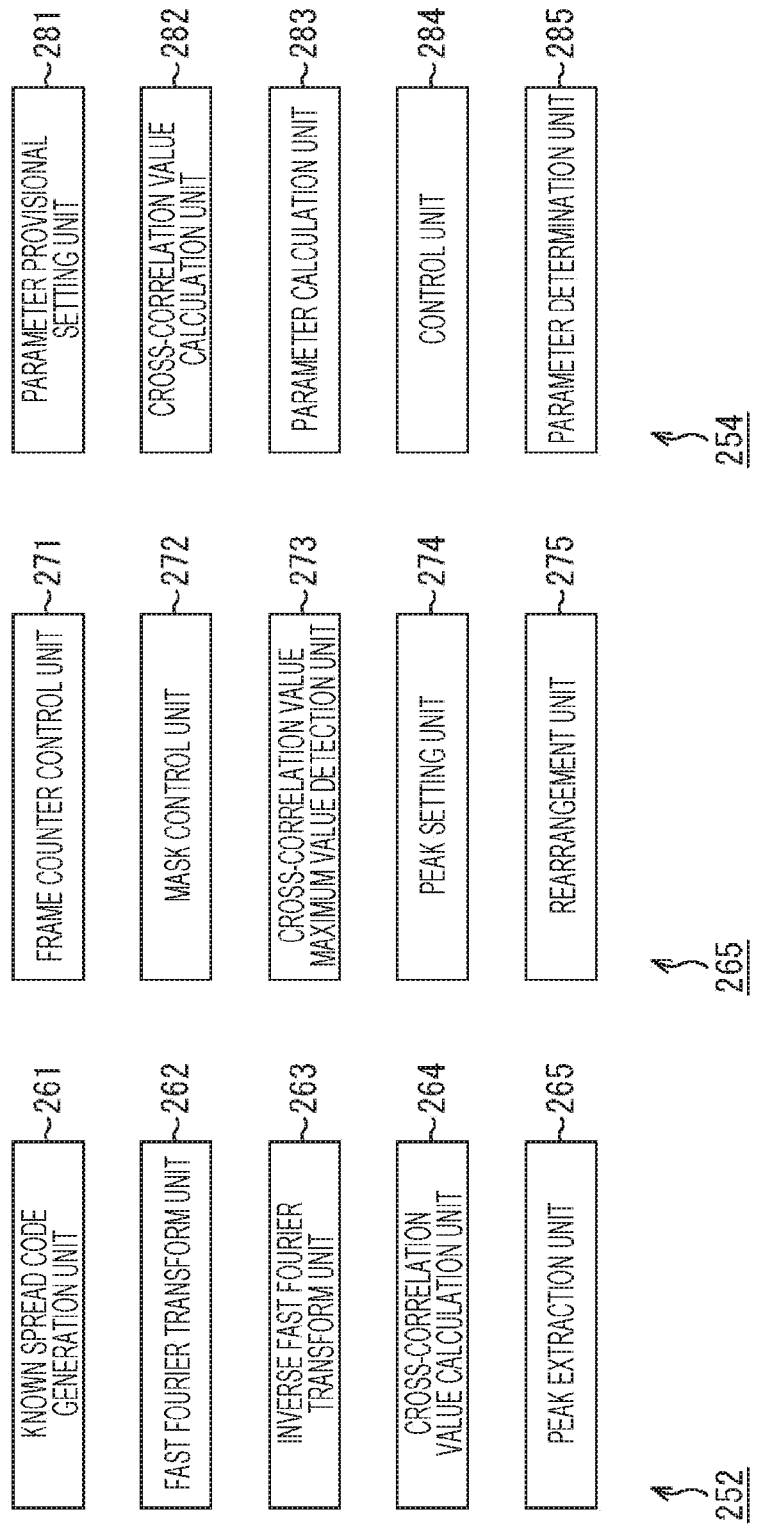

SIGNAL PROCESSING DEVICE AND METHOD THEREOF

CROSS REFERENCE TO RELATED APPLICATIONS

This application is a U.S. National Phase of International Patent Application No. PCT/JP2016/065388 filed on May 25, 2016, which claims priority benefit of Japanese Patent Application No. JP 2015-114913 filed in the Japan Patent Office on Jun. 5, 2015. Each of the above-referenced applications is hereby incorporated herein by reference in its entirety.

TECHNICAL FIELD

The present technology relates to a signal processing device, a method thereof, and a program, and especially relates to a signal processing device, a method thereof, and a program capable of inhibiting deterioration in reception sensitivity.

BACKGROUND ART

In wireless communication that transmits and receives digital data, limit of a wireless communication distance is determined by transmission power of radio waves, performance of an antenna used for transmission and reception, and a transfer rate. Since an increase in the transmission power is directly related to power consumption of a transmitter, there is naturally a limit. The performance of the antenna may be improved by using the Yagi-Uda antenna and the like, but as the performance of the antenna becomes higher, a structure thereof becomes bigger and complicated, so that the performance of the antenna that may be used is limited.

Also, restrictions are imposed on the transmission power by the Radio Law. Furthermore, depending on a frequency band of the radio waves, the transmission power including the performance of the antenna is regulated by the Radio Law. As a result, there is the limit of the transmission power and the performance of the antenna that may be used practically.

A direct sequence spread spectrum (DSSS), for example, is known as technology of realizing long-distance wireless communication escaping from such restriction (for example, refer to Non-Patent Document 1). The DSSS is the technology that enables highly sensitive reception while eliminating an influence of noise by multiplying a reception signal by a spread code to integrate. Extending integration time (that is, lowering a transfer rate) linearly increases the sensitivity, and in the global positioning system (GPS) adopting the DSSS, for example, the signal may be stably received even with an electric field intensity of −150 dBm or lower.

In the GPS, transmission radio waves are continuously transmitted at a stable phase. Therefore, stable phase synchronization is established even in a low signal to noise ratio (SNR) state by adopting a low-band phase locked loop (PLL) or delayed locked loop (DLL). If the phase is correct, weak signals may be detected by integrating and detecting the signals. In a case where a dedicated wireless frequency band is allocated like the GPS, continuous transmission over a long period of time becomes possible as described above, and stable reception may be performed even with the weak signal.

For example, there is a system that transmits information such as a sensor by using radio waves in the 920 Mz band. The 920 MHz band is a frequency band opened from July 2011 by the Ministry of Internal Affairs and Communications, and anyone can use this without a license. However, according to the provision (Association of Radio Industries and Businesses (ARIB) STD T-108), the maximum continuous transmission time is limited to four seconds. If the continuous transmission time is further shortened to, for example, 0.2 seconds, more channels may be allocated, and it is possible to perform transmission and reception with less crosstalk.

CITATION LIST

Non-Patent Document

Non-Patent Document 1: On-Ramp Wireless Incorporated, "On-Ramp Wireless Technology White Paper", 008-0012-00 Rev. H, Jan. 9, 2013

SUMMARY OF THE INVENTION

Problems to be Solved by the Invention

Since continuous transmission time is restricted in this manner, in the 920 MHz band, it is impossible to implement a low-band PLL or DLL on a reception side. Therefore, a lower limit of a transfer rate is determined, and as a result, an upper limit of reception sensitivity might be restricted. That is, the reception sensitivity might be deteriorated as compared with a case without such restriction. For example, in a wireless communication device that is commercially available in the 920 MHz band, the reception sensitivity is limited to approximately −100 dBm to −120 dBm, and there is possibility that a sensitivity difference of several tens of dB occurs as compared with the GPS.

The present technology is proposed in view of such circumstances and an object thereof is to inhibit deterioration in reception sensitivity.

Solutions to Problems

A signal processing device according to the present technology is a signal processing device provided with a transmission unit which transmits data as a wireless signal for each frame, a carrier sense unit which repeats carrier sense of a frequency band in which the transmission unit transmits the data, and a transmission control unit which allows the transmission unit to transmit a data frame in the frequency band as the wireless signal in a case where the frequency band is vacant on the basis of a result of the carrier sense by the carrier sense unit, and further allows the transmission unit to transmit a synchronous frame formed of predetermined information different from the data frame in the frequency band as the wireless signal in a case where the transmission unit transmits the data frame predetermined number of times within first time.

The carrier sense unit may repeat the carrier sense every second time shorter than the first time.

The synchronous frame may be formed of information known by a reception side.

The synchronous frame may be formed of a predetermined pseudo random number sequence determined in advance.

A synchronous frame generation unit which generates the synchronous frame may be further provided.

A data frame generation unit which generates the data frame may be further provided.

The data frame generation unit may generate a plurality of data frames using the same data, and the transmission unit may transmit the plurality of data frames generated by the data frame generation unit to transmit the same data a plurality of number of times.

The data frame generation unit may rearrange the data in the data frame such that a portion known by a reception side of the data frame is more evenly distributed in the data frame.

A signal processing method according to the present technology is an information processing method of a signal processing device provided with transmitting data as a wireless signal for each frame, repeating carrier sense of a frequency band in which the data is transmitted, and transmitting a data frame in the frequency band as the wireless signal in a case where the frequency band is vacant on the basis of a result of the carrier sense, and further transmitting a synchronous frame formed of predetermined information different from the data frame as the wireless signal in the frequency band in a case where the data frame is transmitted predetermined number of times within first time.

A program according to the present technology is a program for allowing a computer to serve as a transmission unit which transmits data as a wireless signal for each frame, a carrier sense unit which repeats carrier sense of a frequency band in which the transmission unit transmits the data, and a transmission control unit which allows the transmission unit to transmit a data frame in the frequency band as the wireless signal in a case where the frequency band is vacant on the basis of a result of the carrier sense by the carrier sense unit, and further allows the transmission unit to transmit a synchronous frame formed of predetermined information different from the data frame in the frequency band as the wireless signal in a case where the transmission unit transmits the data frame predetermined number of times within first time.

A signal processing device according to the present technology is a signal processing device provided with a reception unit which receives a wireless signal of data for each frame, a storage unit which stores a reception signal being the wireless signal received by the reception unit, a synchronous frame detection unit which detects a synchronous frame from the reception signal of predetermined time or longer stored in the storage unit, and a data frame detection unit which detects a data frame from the reception signal of the predetermined time before the synchronous frame stored in the storage unit in a case where the synchronous frame detection unit detects the synchronous frame.

The synchronous frame may be formed of information known by the signal processing device.

The synchronous frame may be formed of a predetermined pseudo random number sequence determined in advance.

A readout unit which reads out the reception signal of the predetermined time before the synchronous frame stored in the storage unit from the storage unit in a case where the synchronous frame detection unit detects the synchronous frame is further provided, in which the data frame detection unit may detect the data frame from the reception signal of the predetermined time before the synchronous frame read out by the readout unit.

The data frame detection unit may detect a head position of the data frame in the reception signal of the predetermined time before the synchronous frame, cut out one-frame data, and detect the data frame for each frame.

A holding unit which holds the reception signal of the predetermined time before the synchronous frame read out by the readout unit is further provided, in which the data frame detection unit may detect the data frame from the reception signal of the predetermined time before the synchronous frame held by the holding unit.

A despreading unit which multiplies the data frame detected by the data frame detection unit by a predetermined pseudo random number sequence and integrates to despread may be further provided.

The data frame detection unit may omit detection of the data frame for the reception signal of the predetermined time before the synchronous frame in a case where the synchronous frame detection unit does not detect the synchronous frame.

A signal processing method according to the present technology is a signal processing method of a signal processing device provided with receiving a wireless signal of data for each frame, storing a reception signal which is the received wireless signal, detecting a synchronous frame from the stored reception signal of predetermined time or longer, and detecting a data frame from the stored reception signal of the predetermined time before the synchronous frame in a case where the synchronous frame is detected.

A program according to the present technology is a program for allowing a computer to serve as a reception unit which receives a wireless signal of data for each frame, a storage unit which stores a reception signal being the wireless signal received by the reception unit, a synchronous frame detection unit which detects a synchronous frame from the reception signal of predetermined time or longer stored in the storage unit, and a data frame detection unit which detects a data frame from the reception signal of the predetermined time before the synchronous frame stored in the storage unit in a case where the synchronous frame detection unit detects the synchronous frame.

In a signal processing device, a method thereof, and a program according to the present technology, data is transmitted as a wireless signal for each frame, carrier sense of a frequency band in which the data is transmitted is repeated, and a data frame is transmitted in the frequency band as the wireless signal in a case where the frequency band is vacant on the basis of a result of the carrier sense, and further, a synchronous frame formed of predetermined information different from the data frame is transmitted as the wireless signal in the frequency band in a case where the data frame is transmitted predetermined number of times within first time.

In another signal processing device, method thereof, and program according to the present technology, the wireless signal of the data of each frame is received, the reception signal which is the received wireless signal is stored in the storage unit, the synchronous frame is detected from the reception signal of predetermined time or longer stored in the storage unit, and the data frame is detected from the reception signal of predetermined time before the synchronous frame stored in the storage unit in a case where the synchronous frame is detected.

Effects of the Invention

According to the present technology, it is possible to process a signal. Also, according to the present technology, deterioration in reception sensitivity may be inhibited.

BRIEF DESCRIPTION OF DRAWINGS

FIG. 9 is a block diagram illustrating a principal configuration example of a reception device.

FIGS. 11A, 11B, and 11C are functional block diagrams illustrating an example of a principal function realized by a CPU.

MODE FOR CARRYING OUT THE INVENTION

Figure 1:
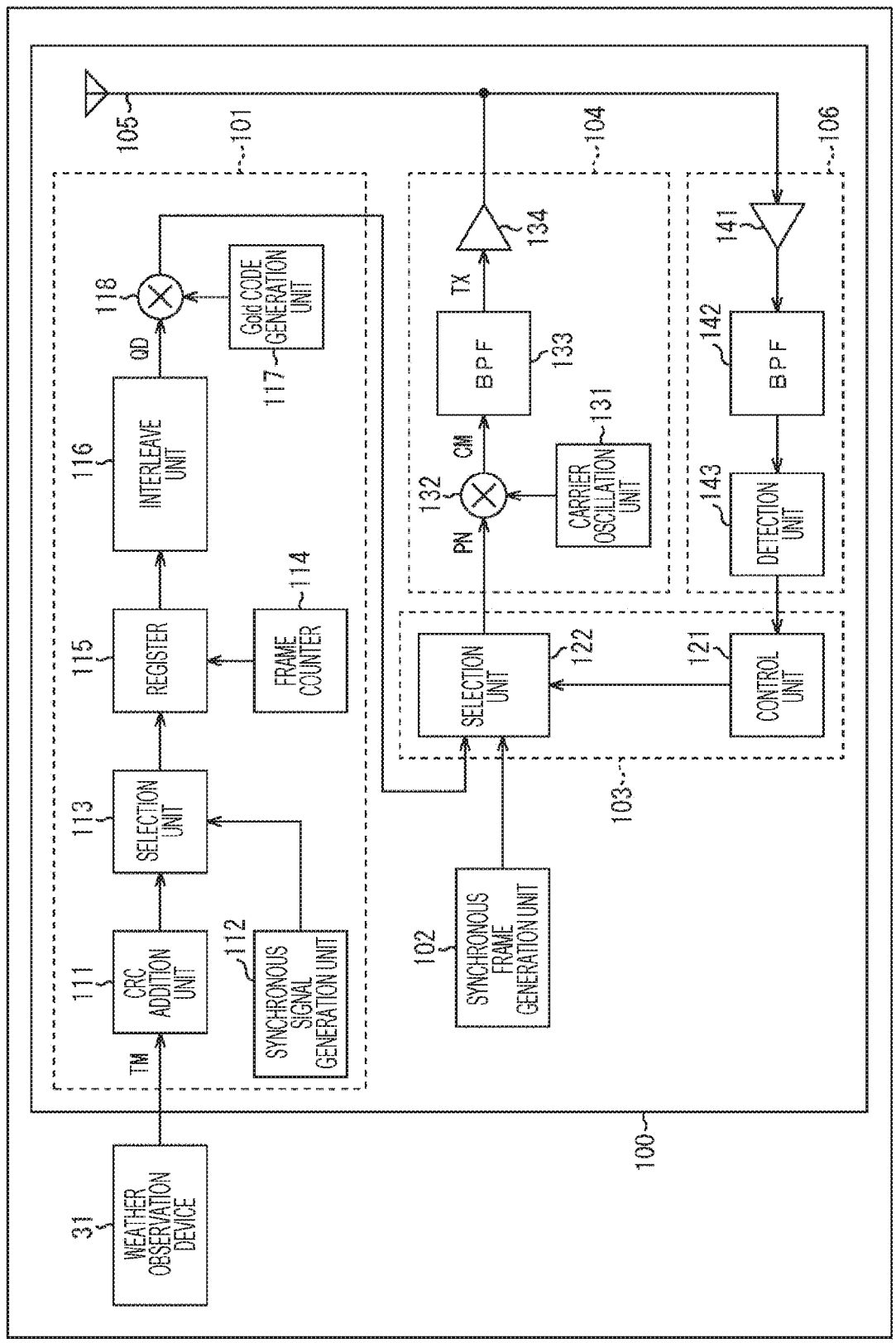
FIG. 1 is a block diagram illustrating a principal configuration example of a transmission device.

Modes for carrying out the present disclosure (hereinafter, referred to as embodiments) are hereinafter described. Meanwhile, the description is given in the following order.
1. First Embodiment (Transmission Device)
2. Second Embodiment (Reception Device)
3. Third Embodiment (Computer)

1. First Embodiment

<Signal Transmission/Reception System>

There is a signal transmission/reception system which transmits weather observation data generated by a weather observation device installed in a place where it is difficult to observe weather data manually such as a mountainous area, for example, a place where it is difficult for people to enter, for example, and the like by a transmission device installed in the same place to a reception device installed in an urban area and the like at the foot (in a research facility such as a university, in a facility such as a data center and the like), for example, as a radio wave (wireless signal).

In such a case, the transmission device is installed in a place where it is difficult to prepare a large-scale external power supply. Therefore, it is necessary to drive the same with a small-scale power supply such as a battery and a solar power generator, for example. That is, that is, the transmission device is required to be driven with lower power consumption. Also, the transmission device and the reception device are installed in places far from each other, and long distance wireless communication is required between them. Also, it is difficult to exclusively use a communication path, and time during which continuous transmission may be performed is limited. Although requirement conditions are severe in this manner, a high transfer rate is unnecessary because an amount of transmission information is small.

<DSSS Scheme>

There is a direct sequence spread spectrum (DSSS) scheme as a highly sensitive transceiver. In the DSSS scheme, it is possible to realize higher sensitivity by setting a code length (spreading factor) of a Gold code to be large.

However, in Japan, continuous transmission time is limited to four seconds or shorter in a 920 MHz band and the like which may be used without a license. Also, in a case where the continuous transmission time is 0.2 seconds or shorter, transmission and reception may be performed in much more frequency bands. If much more frequency bands may be used, it is possible to inhibit an influence such as crosstalk interference.

However, there is possibility that a sufficient reception sensitivity effect cannot be obtained in the 920 MHz band in Japan with the conventional DSSS scheme, because it takes long continuous transmission time. In addition, although it is desirable to further shorten the continuous transmission time to 0.2 seconds or shorter when increasing the number of transmission channels, the reception sensitivity might be further deteriorated in that case.

Also, in a case of the conventional DSSS scheme, if 32768 is adopted as the spreading factor, time integration of 32768 chips should be performed until integration detection of one-bit information is finally realized. Time spent for integration detection of one-bit information is 164 ms. This time is similar also for phase detection performed by a phase locked loop (PLL) and a delayed locked loop (DLL). A phase detection circuit such as the PLL and DLL is formed of a feedback circuit, and a response speed as the loop is further delayed by one digit (10 times) or more with respect to a response speed of a detection circuit. Therefore, the response speed of the PLL (or DLL) of the reception device is expected to be approximately 1.6 seconds.

This becomes restriction of "phase fluctuation" of a carrier oscillation unit of the transmission device. That is, the carrier oscillation unit is required "not to fluctuate in phase during observation for 1.6 seconds". However, it is known that if an oscillator oscillating a high frequency of 920 MHz is produced at a low cost, the phase easily fluctuates due to noise in the oscillator.

It is known that an oscillator a phase of which is stabilized using a rubidium oscillator is adopted in GPS, and the phase fluctuation is small even if the loop response speed exceeds one second. However, the rubidium oscillator is very expensive (hundreds of thousands of yen or higher) and consumes a lot of power. Although such oscillator may be mounted on an expensive GPS satellite, adopting the same in the transmission device used in a sensor network and the like described above might increase a cost unacceptably, and it is not practical.

That is, in the carrier oscillation unit which is inexpensive and has low power enough to be adopted to the transmission device, an upper limit of the spreading factor which may be practically used might be determined by the phase fluctuation.

<Transmission Device>

FIG. 1 is a view illustrating a principal configuration example of a transmission device being an embodiment of a signal processing device to which the present technology is applied.

A weather observation device 31 is a device which observes weather data such as ambient temperature, sunshine, rainfall, wind direction, and wind speed, for example. The weather observation device 31 is provided with various sensors necessary for observing the weather data and a control unit which controls the sensors. The weather observation device 31 supplies the observed weather data (weather observation data) to a transmission device 100. For example, if each of the ambient temperature, rainfall, wind direction, and wind speed has an information amount of one octet (eight bits), weather observation data TM has an information amount of four octets (32 bits).

The weather observation device 31 is installed in a place where it is difficult to observe the weather data manually such as a mountainous area, for example, a place where it is difficult for people to enter, for example, and the like. The transmission device 100 is installed in the vicinity of the weather observation device 31. That is, the weather observation device 31 and the transmission device 100 are installed in places where it is difficult to prepare a large-scale external power supply. Therefore, the devices should be driven by a small-scale power supply such as a battery or a solar power generator. That is, the devices are required to be driven with lower power consumption.

That is, in general, since the place where the weather observation device 31 is installed is a place where it is difficult to obtain sufficient electric power, this is unsuitable for large-scale processing such as collecting the weather observation data TM and taking statistics. Therefore, the transmission device 100 transmits the supplied weather observation data TM to a reception device installed in an urban area and the like at the foot, for example (in a research facility such as a university, in a facility such as a data center and the like).

The reception device supplies the received weather observation data TM to a server and the like and allows the same to perform the large-scale processing such as taking statistics using the weather observation data TM. Meanwhile, since the reception device and the server are installed in the urban area and the like, sufficient electric power may be obtained. Therefore, it is also possible for the reception device to be equipped with a high-performance central processing unit (CPU) to carry out an advanced operation.

However, the transmission device 100 and the reception device should perform long-distance wireless communication, for example, between the top of the mountain and the urban area at the foot. Also, the transmission device 100 transmits the weather observation data TM using the 920 MHz band.

Figure 2:
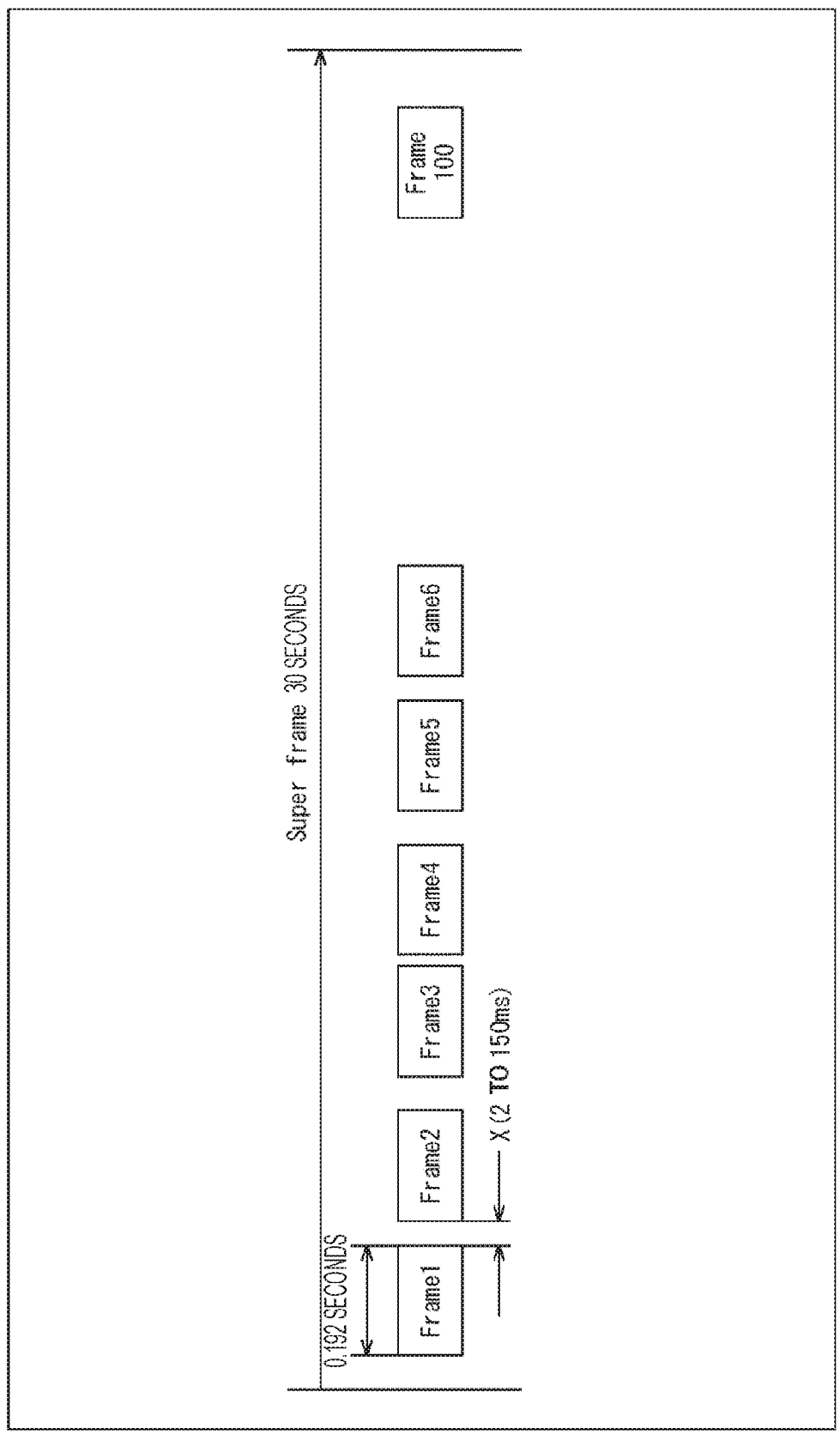
FIG. 2 is a view illustrating a principal configuration example of a super frame.

The transmission device 100 transmits the weather observation data TM in units of super frames having a frame structure as illustrated in FIG. 2, for example. In a case of the conventional DSSS scheme, transmission time of one frame is long to be 24.9 seconds.

On the other hand, in a case of the transmission device 100, as illustrated in FIG. 2, the transmission time of one frame is 0.192 seconds. That is, since continuous transmission time of one time is 0.192 seconds, which is shorter than 0.2 seconds, many transmission channels may be assigned to this transmission in the 920 MHz band. As a result, it becomes possible to select a relatively vacant channel to transmit, so that a system which is more robust over crosstalk may be constructed. By applying the present technology, it is possible to construct a highly sensitive transmission/reception system even with such a short frame length.

As illustrated in FIG. 1, the transmission device 100 includes a data frame generation unit 101, a synchronous frame generation unit 102, a transmission control unit 103, a transmission unit 104, an antenna 105, and a carrier sense unit 106.

The data frame generation unit 101 performs processing regarding generation of a data frame which is a frame including data to be transmitted. In a case of an example in FIG. 1, the data frame generation unit 101 makes the weather observation data TM supplied from the weather observation device 31 the data to be transmitted. The data frame generation unit 101 supplies the generated data frame to the transmission control unit 103 (selection unit 122).

The synchronous frame generation unit 102 performs processing regarding generation of a synchronous frame being a frame formed of predetermined information different from that of the data frame. This synchronous frame is to be described later. The synchronous frame generation unit 102 supplies the generated synchronous frame to the transmission control unit 103 (selection unit 122).

The transmission control unit 103 performs processing regarding transmission control of each frame. For example, the transmission control unit 103 controls transmission of the frame according to a result of carrier sense supplied from the carrier sense unit 106. The transmission control unit 103 supplies the frame to be transmitted to the transmission unit 104.

The transmission unit 104 performs processing regarding transmission of the frame. The transmission unit 104 transmits the frame supplied from the transmission control unit 103 as a wireless signal in a desired frequency band (for example, 920 MHz band) via the antenna 105.

The carrier sense unit 106 performs processing regarding the carrier sense of the frequency band in which the frame is transmitted via the antenna 105. For example, the carrier sense unit 106 repetitively performs the carrier sense. For example, the carrier sense unit 106 repeats the carrier sense every predetermined time. Also, the carrier sense unit 106 supplies the result of the carrier sense to the transmission control unit 103 (control unit 121).

<Data Frame Generation Unit>

As illustrated in FIG. 1, the data frame generation unit 101 includes a cyclic redundancy check (CRC) addition unit 111, a synchronous signal (SYNC) generation unit 112, a selection unit 113, a frame counter 114, a register 115, an interleave unit 116, a Gold code generation unit 117, and a multiplication unit 118.

The CRC addition unit 111 adds a cyclic redundancy check code (CRC) for error detection to the weather observation data TM supplied from the weather observation device 31 and supplies the same to the selection unit 113. The cyclic redundancy check code may be of any type and its data length is arbitrary.

The synchronous signal generation unit 112 generates a predetermined synchronous pattern and supplies the same to the selection unit 113. The synchronous pattern may be of any type and its data length is arbitrary.

The selection unit 113 adds the synchronous pattern supplied from the synchronous signal generation unit 112 to the weather observation data TM to which the cyclic redundancy check code supplied from the CRC addition unit 111 is added by appropriately selecting an input to generate transmission data QD.

In this manner, the selection unit 113 supplies the transmission data QD which is the weather observation data TM to which the cyclic redundancy check code and the synchronous pattern are added to the register 115.

Figure 3:
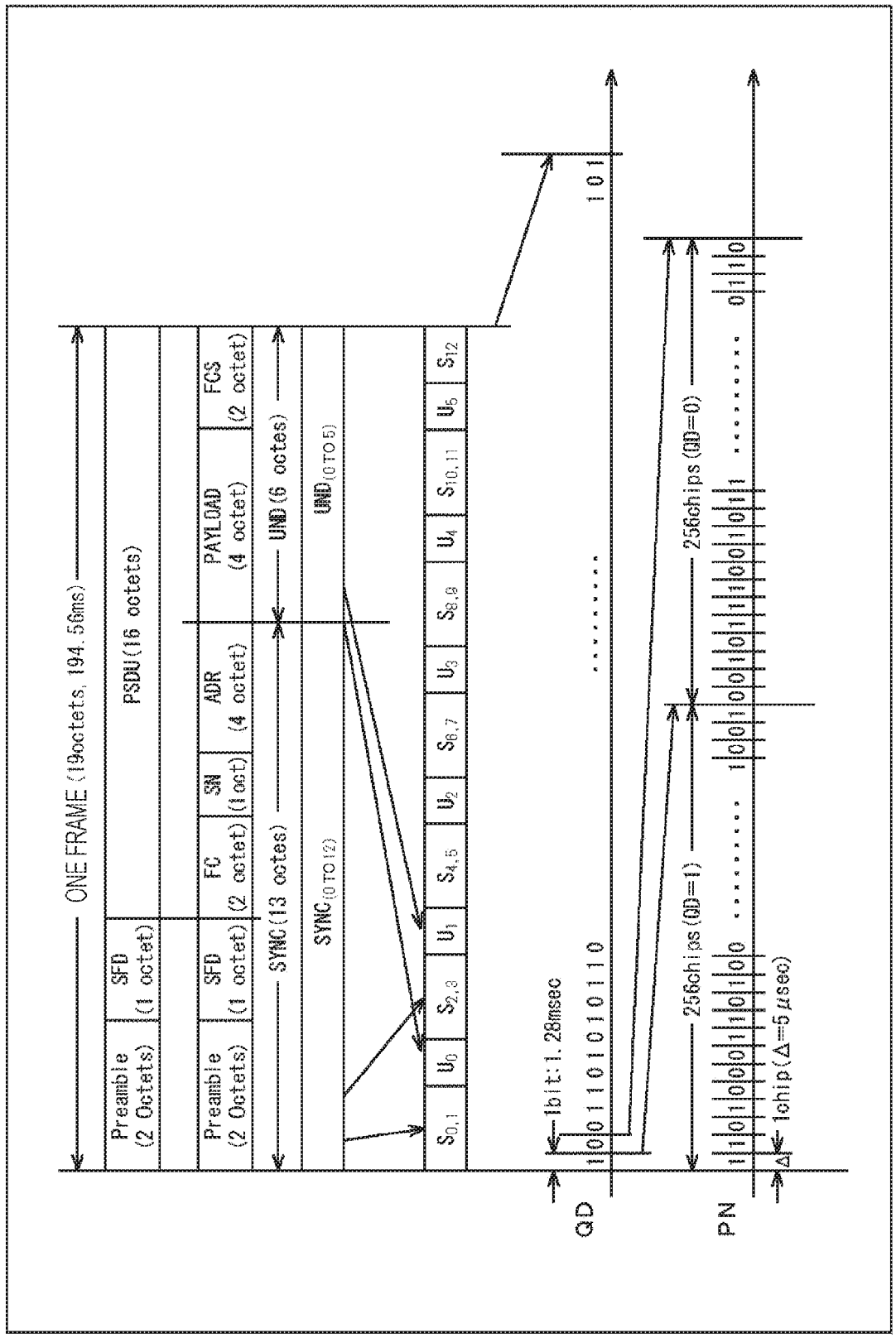
FIG. 3 is a view illustrating an example of a signal in each unit.

As illustrated in a second stage from the top in FIG. 3, in each frame, the weather observation data TM is copied as a payload (PAYLOAD) and a frame check sequence (FCS) is added thereto. The synchronous pattern (preamble, SFD, frame control (FC), sequence number (SN), and transceiver address (ADR)) is also added.

The synchronous pattern is information independent of the weather observation data TM. In other words, all bits (13 octets) of the synchronous pattern are known by the reception device. In this manner, the information "known" by a reception side is referred to as the synchronous pattern (SYNC). The above-described configuration example is merely an example, and a configuration of the synchronous pattern (SYNC) is arbitrary. For example, information other than the above-described information may be included in the synchronous pattern (SYNC), or it is also possible that a part of or entire information described above is not included in the synchronous pattern (SYNC).

On the other hand, the weather observation data TM transmitted as the payload (PAYLOAD) and the frame check sequence (FCS) are information which the reception device cannot estimate in advance. Such information "unknown" by the reception side is referred to as unknown data (UND).

The frame counter 114 in FIG. 1 being a counter for counting the number of transmitted frames, counts from 0 to 99 and supplies a count value to the register 115.

The register 115 is a 19-octet (152-bit) register. When the count value supplied from the frame counter 114 is "0", the register 115 fetches an output (one-frame transmission data QD) from the selection unit 113 and holds the same therein. The register 115 holds the one-frame transmission data QD until the count value supplied from the frame counter 114 reaches "0" next time. The register 115 appropriately supplies the held value to the interleave unit 116. That is, the same transmission data QD is output from the register 115 during a super frame (Super Frame) period. When the count value supplied from the frame counter 114 reaches "0" next time, the register 115 newly fetches the output (one-frame transmission data QD) from the selection unit 113 and holds the same therein.

As illustrated in a fourth stage from the top in FIG. 3, the interleave unit 116 decomposes the synchronous pattern (SYNC) and distributes the same among the UND. This distribution is performed such that the synchronous pattern (SYNC) is spread almost evenly. That is, the interleave unit 116 rearranges the transmission data such that a portion known by the reception side of the transmission data QD is more evenly distributed in the transmission data.

In a case of an example in FIG. 3, the synchronous pattern (SYNC) is 13-octet information and the UND is six-octet information. When the 13-octet synchronous pattern (SYNC) is decomposed into one-octet pieces to obtain SYNC0 to SYNC12, and when the six-octet UND is decomposed into one-octet pieces to obtain UND0 to UND5, the interleave unit 116 rearranges them in the following order, for example.

SYNC0, SYNC1, UND0, SYNC2, SYNC3, UND1, . . . , UND5, SYNC12

By spreading (distributing) the synchronous pattern known by the reception device in the entire frame in this manner to transmit, the reception device which receives the signal may correctly estimate a frequency and an initial phase of a transmission carrier for every short frame. As a result, even with short continuous transmission time, the reception device may receive with high sensitivity.

An example of the rearranged transmission data QD is illustrated in a fifth stage from the top in FIG. 3. The interleave unit 116 supplies the transmission data QD rearranged in this manner to the multiplication unit 118.

The Gold code generation unit 117 formed of two maximum sequence (M sequence) generators generates a pseudo random number sequence having length of 256 bits (256 chips). For example, the Gold code generation unit 117 generates a bit sequence of a predetermined pattern having the length of 256 bits as the pseudo random number sequence. The pseudo random number sequence may be of any type and its data length is arbitrary. The Gold code generation unit 117 supplies the same to the multiplication unit 118.

The multiplication unit 118 multiplies the rearranged transmission data QD supplied from the interleave unit 116 by the pseudo random number sequence supplied from the Gold code generation unit 117 to generate a pseudo random number sequence PN. That is, the multiplication unit 118 allocates the pseudo random number sequence to each bit of the transmission data QD and generates a 38400-bit (152 bits×256 chips) pseudo random number sequence PN from each transmission packet.

At that time, the pseudo random number sequence allocated to the bit having a value "0" (QD=0) of the transmission data QD and the pseudo random number sequence allocated to the bit having a value "1" (QD=1) of the transmission data are such that the value of each bit is inverted. That is, for example, the multiplication unit 118 allocates the pseudo random number sequence to the bit having the value of "0" (QD=0) of the transmission data QD and allocates the pseudo random number sequence obtained by inverting the value of each bit to the bit having the value of "1" (QD=1) of the transmission data QD. More specifically, for example, as illustrated in the lowest stage in FIG. 3, the multiplication unit 118 allocates the pseudo random number sequence "1101000110100 . . . 1001" to the bit having the value of "1" (QD=1) of the transmission data QD and allocates the pseudo random number sequence "0010111001011 . . . 0110" to the bit having the value of "0" (QD=0) of the transmission data QD.

In the pseudo random number sequence PN, a spread coefficient is 256 and a chip interval Δ is 5 μs. The multiplication unit 118 supplies the pseudo random number sequence PN generate d in the above-described manner to the transmission control unit 103 (selection unit 122) as the data frame.

<Transmission Control Unit>

Also, as illustrated in FIG. 1, the transmission control unit 103 includes the control unit 121 and the selection unit 122.

The control unit 121 controls selection by the selection unit 122 according to the result of the carrier sense supplied from the carrier sense unit 106.

The selection unit 122 selects anyone of the data frame supplied from the multiplication unit 118 and the synchronous frame supplied from the synchronous frame generation unit 102 under the control of the control unit 121, and supplies the selected frame to the transmission unit 104 (multiplication unit 132) as a frame to be transmitted (pseudo random number sequence PN).

<Transmission Unit>

Also, as illustrated in FIG. 1, the transmission unit 104 includes a carrier oscillation unit 131, a multiplication unit 132, a band-pass filter (BPF) 133, and an amplification unit 134.

The carrier oscillation unit 131 oscillates at a carrier frequency used for wireless transmission to generate a carrier signal (carrier wave). The carrier oscillation unit 131 supplies the generated carrier signal to the multiplication unit 132.

The multiplication unit 132 modulates polarity of the carrier signal according to the frame to be transmitted (pseudo random number sequence PN), thereby performing BPSK modulation as the DSSS scheme. For example, in a case where the pseudo random number sequence PN is "1", it is modulated such that a phase of the carrier is $\pi$, and in a case where the pseudo random number sequence PN is "0", it is modulated such that the phase of the carrier is $-\pi$ (polarity inversion). The multiplication unit 132 supplies a modulation result as a modulation signal CM to the band-pass filter (BPF) 133.

Since the modulation signal CM the polarity of which is inverted in this manner changes drastically at a switching point portion, this is spread over wide frequency components. Wireless communication in a similar band is affected if this is wirelessly transmitted as-is.

Therefore, the band-pass filter 133 limits the frequency component of the modulation signal CM to the vicinity of the carrier frequency. The band-pass filter 133 supplies the modulation signal CM band-limited in this manner to the amplification unit 134 as a transmission signal TX.

The amplification unit 134 amplifies the supplied transmission signal TX and radiates the same as a radio wave (wireless signal) from the antenna 105. That is, the amplification unit 134 transmits the amplified transmission signal TX as the wireless signal via the antenna 105.

<Carrier Sense Unit>

Also, as illustrated in FIG. 1, the carrier sense unit 106 includes an amplification unit 141, a band-pass filter (BPF) 142, and a detection unit 143.

The amplification unit 141 receives the wireless signal via the antenna 105 and amplifies the same as a reception signal. The amplification unit 141 supplies the amplified reception signal to the band-pass filter 142.

The band-pass filter 142 limits the frequency component of the amplified reception signal to the vicinity of the frequency band to which the frame is transmitted. For example, the band-pass filter 142 limits the frequency components of the amplified reception signal to the 920 MHz band. The band-pass filter 142 supplies the band-limited reception signal to the detection unit 143.

The detection unit 143 carries out the carrier sense using the band-limited reception signal. That is, the detection unit 143 detects this reception signal and checks whether any other communication is being performed in this frequency band (whether the band is in use). The detection unit 143 supplies the result of the carrier sense to the control unit 121.

<Insertion of Synchronous Frame>

Figure 4:
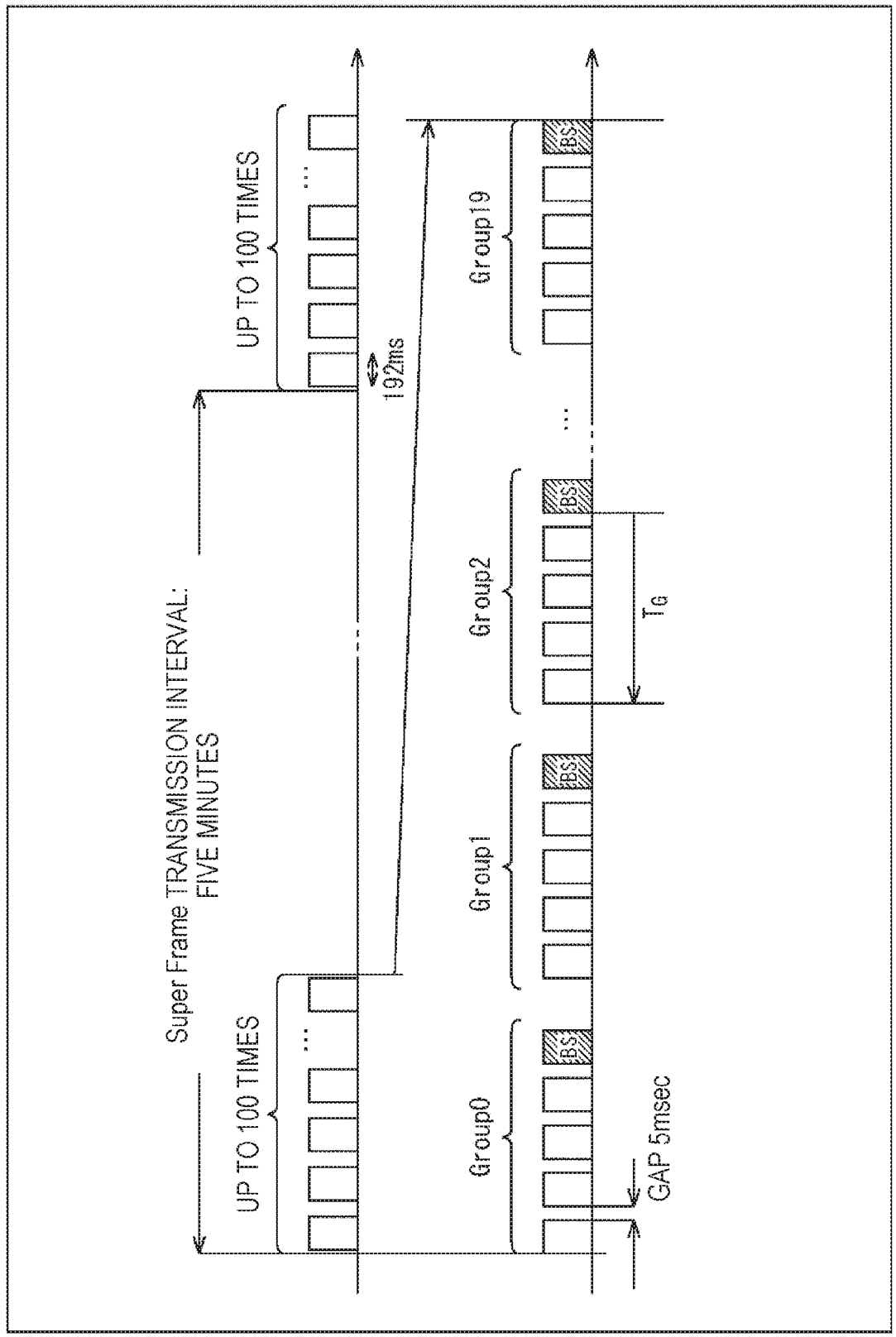
FIG. 4 is a view illustrating an example of a state of transmission of a synchronous frame.

FIG. 4 illustrates a more detailed example of the structure of the super frame of the transmission signal transmitted by the transmission device 100 having the above-described configuration. As described with reference to FIG. 2, the transmission device 100 limits the continuous transmission time of one time to 0.192 seconds by transmitting the transmission signal frame by frame. The same applies to the example in FIG. 4. By doing so, since the continuous transmission time is shorter than 0.2 seconds, in a case of using the 920 MHz band, much more transmission channels may be allocated. As a result, it becomes easier to use the relatively vacant channel, so that it is possible to construct the system more robust over the crosstalk. In addition, the transmission device 100 may construct a highly sensitive transmission/reception system even by using such a short frame length.

As illustrated in FIG. 4, the frames are transmitted in units of super frames (Super Frames) at five-minute intervals. In five minutes, 0.192-second frames are repeated up to 100 times. Herein, a gap between the frames requires at least 2 ms or more according to the provisions of the Radio Law. Actual length of the gap varies every time depending on the result of carrier sense (that is, a degree of crowding of the channel (band)), and if the channel is congested it may be a long time.

In a case where the channel is sufficiently vacant, if the gap is set to 8 ms, the frame is transmitted exactly every 0.2 seconds. As a result, in a case where all the channels are vacant, it is possible to transmit all 100 frames in 20 seconds. Actually, however, in a case where a channel is in use, it must wait until the channel becomes available.

By dividing into a lot of frames to transmit, it is possible to increase a signal to noise ratio (SNR) by integrating the reception signals on the reception side. However, there is possibility that it becomes difficult to distinguish whether the frame is transmitted even by doing so when the signal level drops such as in a case where the transmission device 100 is located far from the reception device.

Therefore, as illustrated in FIG. 4, it is configured such that one synchronous frame (BS) is transmitted only in a case where four data frames are successfully transmitted during predetermined time TG (first time). In other words, it is configured such that in a case where the four data frames cannot be transmitted during the predetermined time TG (first time), the synchronous frame (BS) is not transmitted.

The carrier sense unit 106 repeats the carrier sense every second time shorter than the predetermined time TG to carry out the carrier sense four or more times during the predetermined time TG. If the result of the carrier sense indicating that the band is vacant is obtained four or more times during the predetermined time TG, the transmission of the data frame is successful four or more times during the predetermined time TG.

This synchronous frame is a frame for synchronization formed of predetermined information different from that of the data frame. For example, this synchronous frame may be formed of information known by the reception side. Also, for example, the synchronous frame may be formed of a predetermined pseudo random number sequence determined in advance (PN 15 random number sequence).

By making this synchronous frame the information known by the reception side, the reception device may detect the synchronous frame with a higher degree of accuracy even in a case where the SNR of the synchronous frame is low in the reception signal.

Then, by controlling the transmission of the synchronous frame as described above, in a case where this synchronous frame is detected, it is ensured that the four data frames are present within a range of predetermined time TG (for example, 1.2 seconds) earlier in time from the synchronous frame. Therefore, the four data frames are surely present in the predetermined time TG even if the SNR is low and presence thereof is difficult to be found buried in noise, data frame detection may be performed on the premise of that, so that it is possible to detect the data frame with a higher degree of accuracy. In other words, deterioration in reception sensitivity may be inhibited.

If the synchronous frame is transmitted prior to the data frame, it is not ensured that the frame is transmitted in the band where the carrier sense is required before the frame transmission, for example, in the 920 MHz band, so that, on the reception side, it is difficult to utilize a detection result of the synchronous frame for detecting the data frame. For example, even if the transmission of the synchronous frame is successful, there is also possibility that transmission of the data frame after that fails (the band is in use).

For this reason, it is difficult to correctly grasp transmission timing of the subsequent data frame, so that it is difficult to improve the detection accuracy.

That is, as described above, if the synchronous frame is transmitted after the data frame, and further the synchronous frame is transmitted only in a case where the transmission of the data frame is successful, and the period of time during which the data frame is transmitted is made finite, the presence of predetermined number of data frames is ensured in a predetermined period based on the synchronous frame on the reception side, and the detection accuracy of the frame may be improved.

In other words, the transmission device 100 may realize the transmission of the wireless signal to a longer distance while inhibiting an increase in power consumption of the entire device. Therefore, by applying the transmission device 100, it is possible to more easily realize a system which transmits the weather observation data obtained by the weather observation device 31 installed in the place where it is difficult to manually observe the weather data such as the mountainous area, the place where it is difficult to secure the large-scale external power supply, for example, to the urban area and the like at the foot, for example (in the research facility such as the university, the facility such as the data center and the like).

The transmission control unit 103 controls the transmission of frames in the above-described manner. That is, the control unit 121 controls the selection unit 122 to select the frame to be transmitted so that the data frame and the synchronous frame are transmitted as described above.

As illustrated in FIG. 4, one group is formed of four data frames and one synchronous frame. That is, the transmission of the frame is performed for each group formed of the five frames. In a case of the example in FIG. 4, the transmission of the frame is performed up to 100 times in the super frame, so that the maximum number of groups is 20 (Group0 to Group19).

<Flow of Transmission Process>

Next, an example of a flow of a transmission process executed by the transmission device 100 as described above is described with reference to a flowchart in FIG. 5. When data to be transmitted (for example, weather observation data TM) is input, the transmission device 100 starts the transmission process.

When the transmission process is started, the CRC addition unit 111 adds the cyclic redundancy check code (CRC) to the weather observation data TM (payload) at step S101.

At step S102, the synchronous signal generation unit 112 generates a predetermined synchronous pattern (known by the reception device) and the selection unit 113 adds the synchronous pattern to the weather observation data TM to which the cyclic redundancy check code (CRC) is added.

At step S103, the register 115 stores the weather observation data TM to which the synchronous pattern and the cyclic redundancy check code (CRC) are added generated at step S102 at timing when the count value of the frame counter 114 is "0".

At step S104, the frame counter 114 counts the number of times of transmission of the weather observation data TM to which the synchronous pattern and the cyclic redundancy check code (CRC) are added held in the register 115.

At step S105, the interleave unit 116 reads out the weather observation data TM to which the synchronous pattern and the cyclic redundancy check code (CRC) are added held in the register 115.

At step S106, the interleave unit 116 divides the synchronous pattern and the UND of the weather observation data TM to which the synchronous pattern and the cyclic redundancy check code (CRC) are added and rearranges them such that the synchronous pattern is more evenly distributed to generate the transmission data QD.

At step S107, the Gold code generation unit 117 generates a predetermined pseudo random number sequence.

At step S108, the multiplication unit 118 multiplies the transmission data QD by the pseudo random number sequence to generate the pseudo random number sequence PN.

At step S109, the transmission control unit 103, the transmission unit 104, and the carrier sense unit 106 transmit the frames for each group.

When the process at step S109 is finished, the transmission process is finished.

The processes at each of the above-described steps may be executed in an arbitrary order, executed in parallel, and repeatedly executed as necessary. Then, each process of the transmission process is repeatedly executed for each frame while the input of the data to be transmitted continues.

<Flow of Group Transmission Process>

Figure 5:
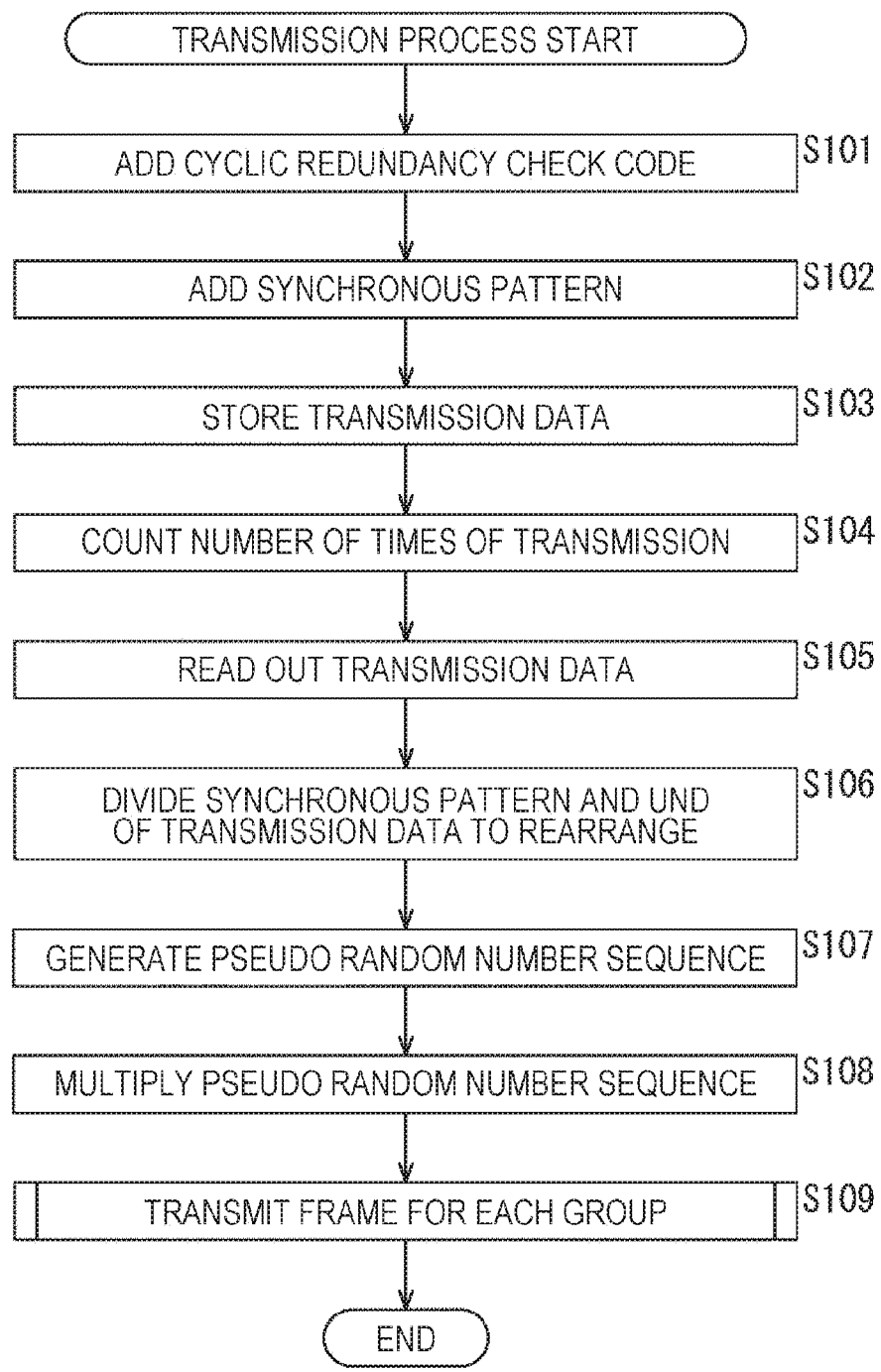
FIG. 5 is a flowchart illustrating an example of a flow of a transmission process.

Next, an example of a flow of a group transmission process executed at step S109 in FIG. 5 is described with reference to a flowchart in FIG. 6. The control unit 121 enters a transmission mode at five-minute intervals. In the transmission mode, this group transmission process is repeated 20 times, and a total of 100 frames are transmitted.

In the transmission mode, the control unit 121 resets a transmission data frame counter Nt to an initial value ("0") at step S121. Also, at step S122, the control unit 121 sets transmission start time Tstart to time at that time (current time).

At step S123, the carrier sense unit 106 performs the carrier sense on a frequency band in which the signal is transmitted (transmission frequency). At step S124, the control unit 121 determines whether the transmission frequency is in use on the basis of the result of the carrier sense. In a case where it is determined that the band of the transmission frequency is vacant, the procedure shifts to step S125.

At step S125, the selection unit 122 selects the data frame under the control of the control unit 121 and supplies the same to the multiplication unit 132 as the pseudo random number sequence PN. At step S126, the transmission unit 104 transmits the selected data frame (pseudo random number sequence PN) via the antenna 105.

At step S127, the control unit 121 increments the transmission data frame counter Nt by "+1". At step S128, the control unit 121 determines whether the value of the transmission data frame counter Nt reaches "4". In a case where the value of the transmission data frame counter Nt does not reach "4", that is, it is determined that the number of times of transmission of the data frame is three or smaller, the procedure shifts to step S129.

At step S129, the control unit 121 stands by for 2 mS. Then, the procedure returns to step S123 and the subsequent processes are repeated.

Also, in a case where it is determined at step S124 that the transmission frequency is in use, the procedure returns to step S123 and the subsequent processes are repeated.

As described above, each of the processes at step S123 to step S129 is repeatedly executed until the data frame is transmitted four times.

Then, in a case where it is determined at step S128 that the value of the transmission data frame counter Nt reaches "4", that is, the data frame is transmitted four times, the procedure shifts to step S130. Next, the synchronous frame is transmitted.

At step S130, the carrier sense unit 106 performs the carrier sense for the band of the transmission frequency. At step S131, the control unit 121 determines whether the transmission frequency is in use on the basis of the result of the carrier sense. In a case where it is determined that the transmission frequency is in use, the procedure returns to step S130 and the subsequent processes are repeated.

Also, in a case where it is determined at step S131 that the band of the transmission frequency is vacant, the procedure shifts to step S132.

At step S132, the control unit 121 calculates a difference between the current time and the time at Tstart as total expended time TP so far. At step S133, the control unit 121 compares the total expended time TP with the predetermined time TG set in advance (for example, 1.2 seconds), and determines whether the total expended time TP is shorter than the predetermined time TG. In a case where it is determined that the total expended time TP is shorter than the predetermined time TG, the procedure shifts to step S134.

That is, in this case, the transmission of the four data frames is successful during the predetermined time TG. Therefore, at step S134, the selection unit 122 is controlled by the control unit 121 to select the synchronous frame and supplies the same to the multiplication unit 132 as the pseudo random number sequence PN. At step S135, the transmission unit 104 transmits the selected synchronous frame (pseudo random number sequence PN) via the antenna 105.

When the process at step S135 is finished, the group transmission process is finished and the procedure returns to FIG. 5.

Also, in a case where it is determined at step S133 that the total expended time TP is equal to or longer than the predetermined time TG, this means that the four data frames cannot be transmitted during the predetermined time TG (exceeding the predetermined time TG). Therefore, the processes at steps S134 and S135 are omitted (the transmission of the synchronous frame is omitted). That is, the group transmission process is finished and the procedure returns to FIG. 5.

<Flow of Carrier Sense Process>

Figure 6:
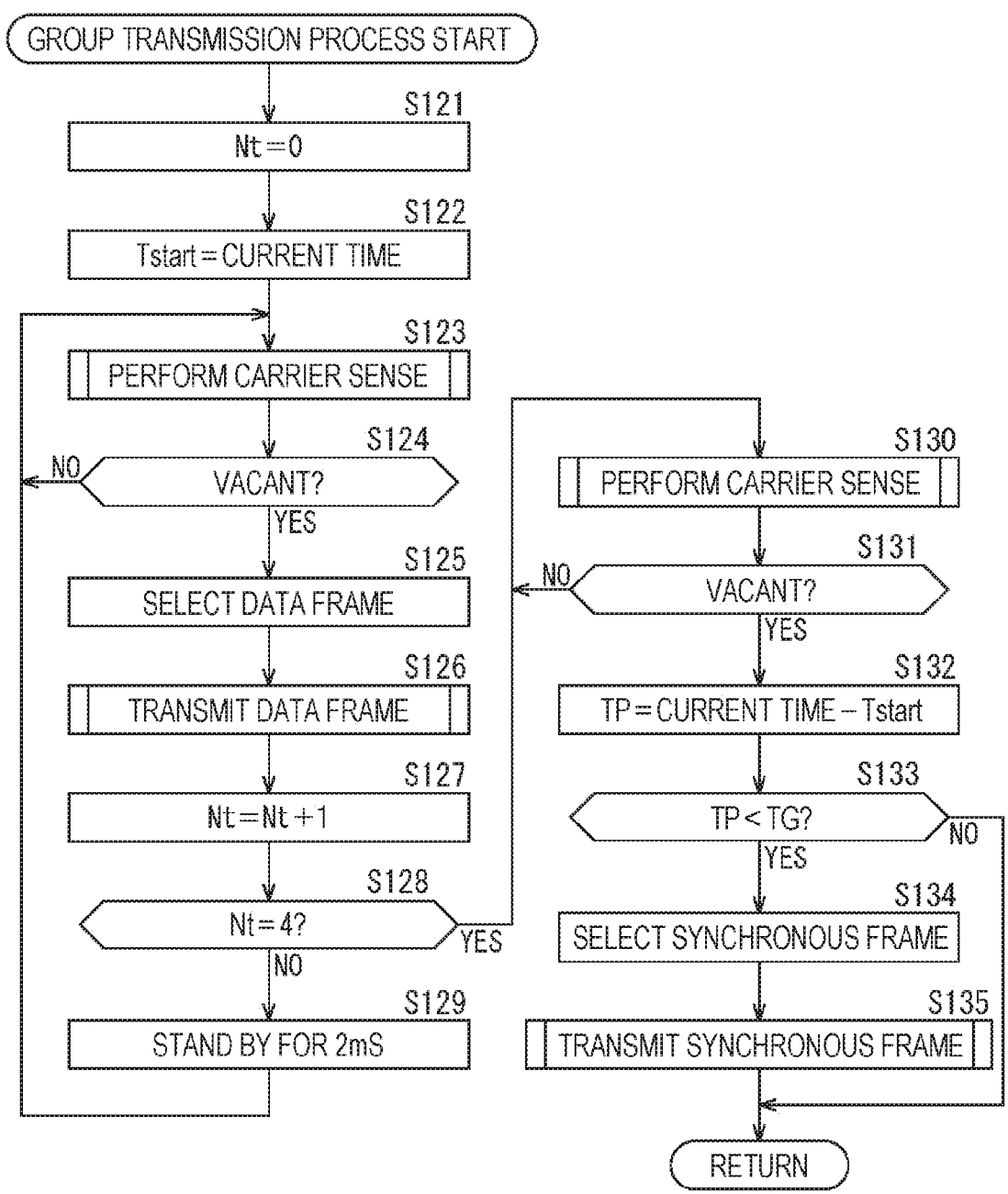
FIG. 6 is a flowchart illustrating an example of a flow of a group transmission process.
Figure 7:
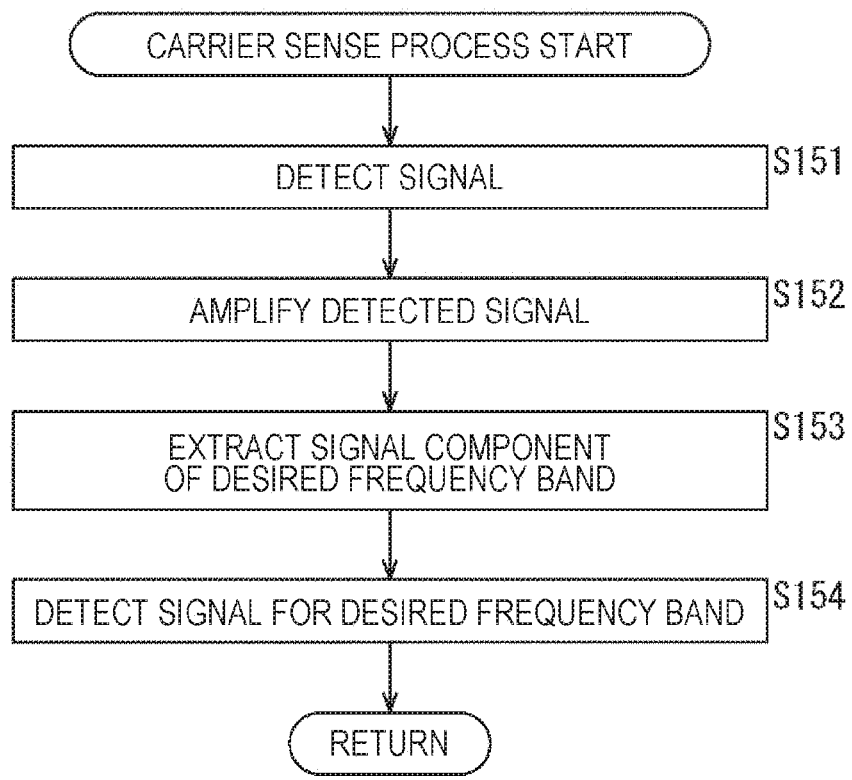
FIG. 7 is a flowchart illustrating an example of a flow of a carrier sense process.

Next, an example of a flow of a carrier sense process executed at step S123 and step S130 in FIG. 6 is described with reference to a flowchart in FIG. 7.

When the carrier sense process is started, the amplification unit 141 of the carrier sense unit 106 detects a signal transmitted through the air via the antenna 105. At step S152, the amplification unit 141 amplifies the detected signal.

At step S153, the band-pass filter 142 extracts a signal component of a desired frequency band (that is, the band of the transmission frequency) from the amplified signal.

At step S154, the detection unit 143 detects a signal of another communication from the extracted signal component of the desired frequency band. The detection unit 143 supplies a result of the detection to the control unit 121 as the result of the carrier sense.

When the process at step S154 is finished, the carrier sense process is finished and the procedure returns to FIG. 6.

<Flow of Frame Transmission Process>

Figure 8:
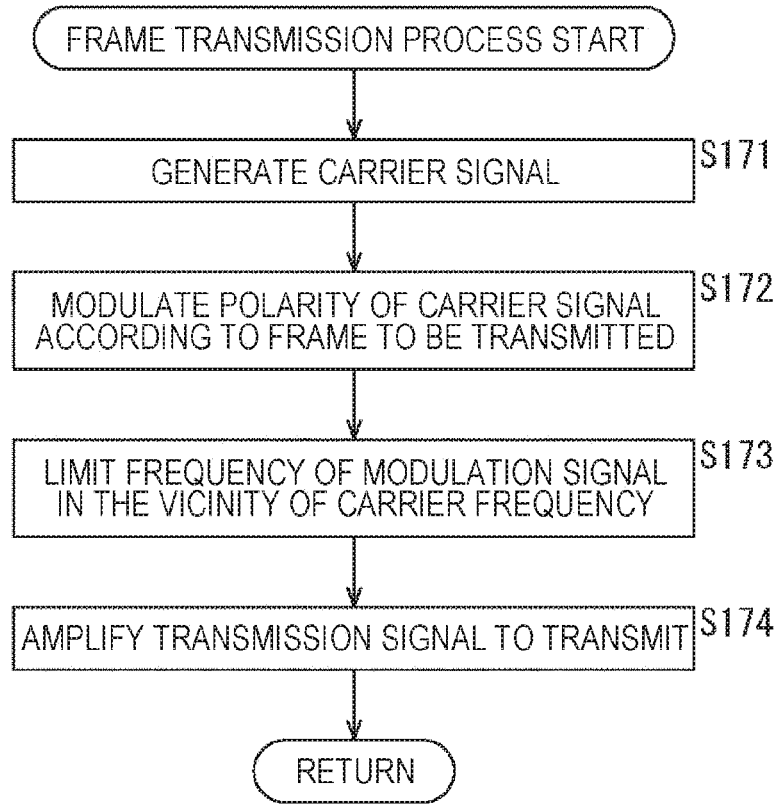
FIG. 8 is a flowchart illustrating an example of a flow of a frame transmission process.

Next, an example of a flow of a frame transmission process executed at steps S126 and S135 in FIG. 6 is described with reference to a flowchart in FIG. 8. Meanwhile, the data frame is transmitted at step S126, and the synchronous frame is transmitted at step S135, but the contents of the process are the same.

When the frame transmission process is started, at step S171, the carrier oscillation unit 131 of the transmission unit 104 generates the carrier signal.

At step S172, the multiplication unit 132 modulates polarity of the carrier signal generated by the carrier oscillation unit 131 according to the frame (frame to be transmitted) supplied from the selection unit 122.

At step S173, the band-pass filter 133 limits the frequency of the modulation signal being the carrier signal modulated by the multiplication unit 132 to the vicinity of the carrier frequency.

At step S174, the amplification unit 134 amplifies the transmission signal being the modulation signal whose band is limited to the vicinity of the carrier frequency, and transmits the same as the wireless signal via the antenna 105.

When the process at step S174 is finished, the frame transmission process is finished and the procedure returns to FIG. 6.

By executing each process in the above-described manner, the transmission device 100 may transmit the synchronous frame only in a case where transmitting the data frame predetermined number of times during a predetermined time. By transmitting the frame in this manner, each frame may be more easily detected and the signal may be received with a higher degree of sensitivity on the reception side. That is, the transmission device 100 may inhibit deterioration in reception sensitivity.

<Others>

Meanwhile, numerical values such as the time and the number of times described above are merely an example and are not limited to the example described above. For example, the transmission time of the super frame is arbitrary and may be longer or shorter than five minutes. Also, the number of times of transmission of the frames in the super frame is arbitrary, and this may be larger or smaller than 100 times. Furthermore, the number of data frames included in one group is arbitrary. That is, the number of data frames to be successfully transmitted before the synchronous frame is arbitrary, and this may be more or less than four frames. Also, the transmission time of one frame may be shorter than 0.192 seconds. Also, width (time) of the gap between the frames is arbitrary. This may be 5 mS, 2 mS, or any other length. Furthermore, the predetermined time TG is also arbitrary, and may be longer or shorter than 1.2 seconds.

Meanwhile, the data transmitted by the transmission device 100 is arbitrary and is not limited to the weather observation data described above. That is, the transmission device 100 may be applied to any system, and may be applied to a system other than the system for observing weather data described above.

2. Second Embodiment

<Reception Device>

FIG. 9 is a view illustrating a principal configuration example of a reception device being an embodiment of a signal processing device to which the present technology is applied. A reception device 200 illustrated in FIG. 9 is a device which receives and demodulates a transmission signal TX transmitted from a transmission device 100 in FIG. 1, and obtains, for example, weather observation data (for example, observation data such as ambient temperature, sunshine, rainfall, wind direction, and wind speed) and the like. The reception device 200 is installed in, for example, an urban area at the foot and the like (in a research facility such as a university, in a facility such as a data center and the like) and receives a wireless signal transmitted from the transmission device 100 installed in a mountainous area and the like (that is, wireless signal transmitted from a distance).

As illustrated in FIG. 9, the reception device 200 includes a reception unit 201 and a central processing unit (CPU) 202. The reception unit 201 performs processing regarding reception of the wireless signal transmitted from the transmission device 100. The CPU 202 performs processing to decode the reception signal received by the reception unit 201 and obtain the transmitted data (for example, weather observation data TM and the like), and the like.

As illustrated in FIG. 9, the reception unit 201 includes an antenna 211, a low noise amplification unit 212, a band-pass filter (BPF) 213, a carrier oscillation unit 214, a multiplication unit 215, a 90-degree shifter 216, a multiplication unit 217, an A/D converter 218, and a memory 219.

The low noise amplification unit 212 receives the wireless signal (transmission signal TX) via the antenna 211, amplifies the reception signal, and supplies the same to the band-pass filter 213.

The band-pass filter 213 removes an unnecessary frequency component from the reception signal and supplies the same to the multiplication unit 215 and the multiplication unit 217.

The carrier oscillation unit 214 generates a signal of a carrier frequency of a predetermined frequency used in transmission and reception. For example, in a case where receiving a signal transmitted in a 920 MHz band, the carrier oscillation unit 214 oscillates at 920 MHz. The carrier oscillation unit 214 supplies an oscillation signal (carrier signal) to the multiplication unit 215 and the 90-degree shifter 216.

The multiplication unit 215 multiplies the reception signal supplied from the band-pass filter 213 by the carrier signal supplied from the carrier oscillation unit 214 to generate a baseband inphase signal (I signal). The multiplication unit 215 supplies the I signal to the A/D converter 218.

The 90-degree shifter 216 shifts a phase of the carrier signal supplied from the carrier oscillation unit 214 by 90 degrees. The 90-degree shifter 216 supplies the phase-shifted carrier signal to the multiplication unit 217.

The multiplication unit 217 multiplies the reception signal supplied from the band-pass filter 213 by the 90-degree phase-shifted carrier signal supplied from the 90-degree shifter 216 to generate a baseband quadrature signal (Q signal). The multiplication unit 215 supplies the Q signal to the A/D converter 218.

The A/D converter 218 A/D converts the supplied I signal and Q signal respectively and supplies digital data thereof to the memory 219 for storage. A conversion rate of the A/D converter 218 is required to exceed a chip rate used for transmission. For example, in a case where transmission at a chip rate of 200 K/s is performed with A=5 µs, the A/D converter 218 is required to perform the A/D conversion at the conversion rate of at least 200 KHz or larger.

The memory 219 includes a predetermined storage medium, obtains the digital data of the I signal and the Q signal supplied from the A/D converter 218, and stores the same in the storage medium. The storage medium may be of any type, for example, a semiconductor memory, a magnetic recording medium such as a hard disk, or any other storage medium. In a case where the A/D conversion is performed for 30 seconds by the A/D converter 218 with eight-bit precision and double conversion rate (400 KHz), the memory 219 stores the 24-megabyte (24-Mbyte) digital data of the I and Q signals.

The CPU 202 realizes various functions by executing a program and processing the data. For example, the CPU 202 reads out the digital data of the I signal and the Q signal stored in the memory 219, performs a decoding process, and restores the weather observation data TM and the like. The CPU 202 outputs the restored weather observation data TM.

Meanwhile, the CPU 202 incorporates a register 221, and may hold the data read out from the memory 219. Also, the CPU 202 includes all the components necessary for executing the process and the like, such as a ROM and a RAM.

<Functional Block of CPU>

Figures 10A, 10B, 10C:
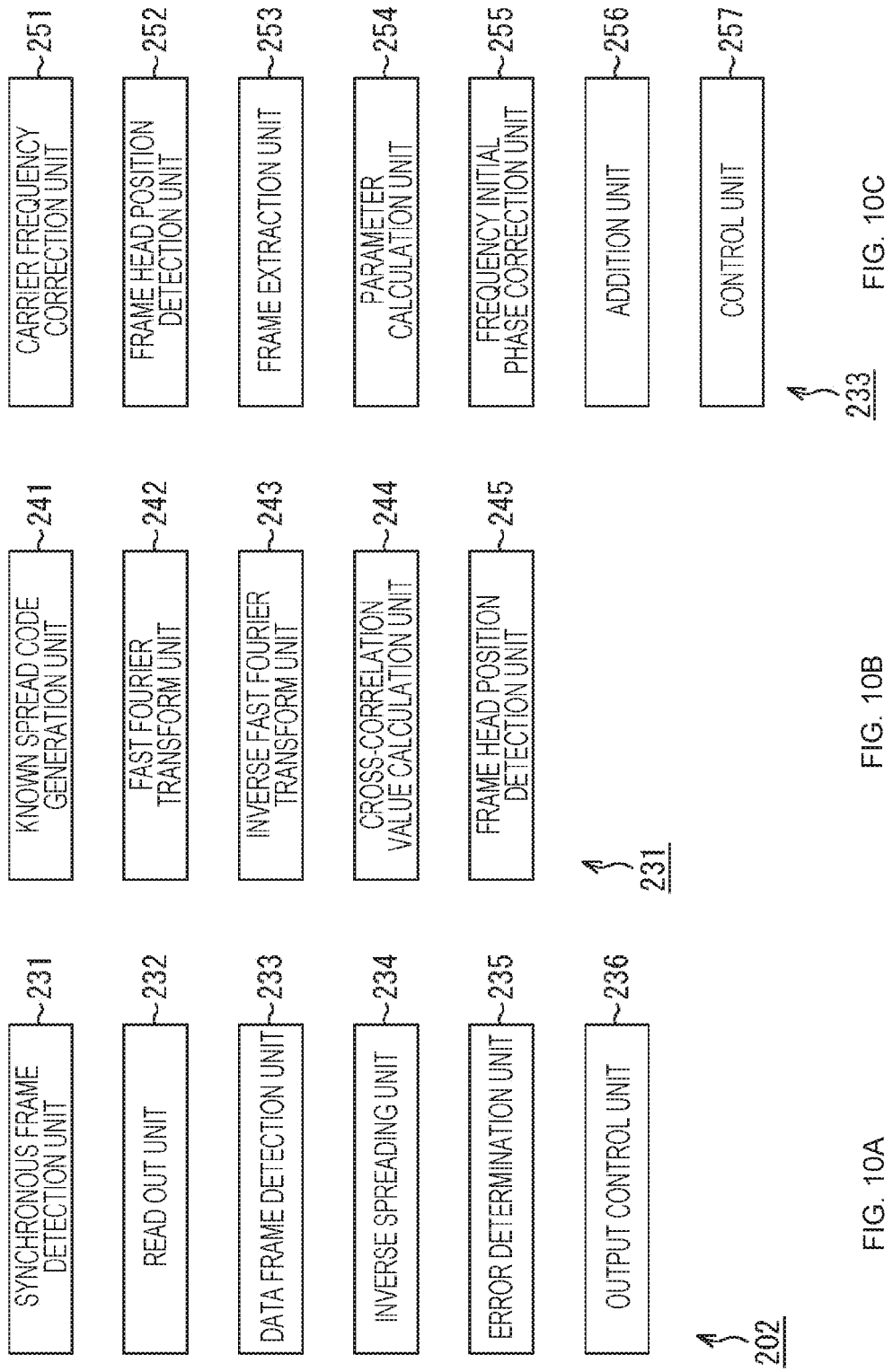
FIGS. 10A, 10B, and 10C are functional block diagrams illustrating an example of a principal function realized by a CPU.

FIGS. 10A, 10B, and 10C and FIGS. 11A, 11B, and 11C are functional block diagrams illustrating a principal configuration example of functions realized by the CPU 202. As illustrated in FIG. 10A, the CPU 202 includes a synchronous frame detection unit 231, a readout unit 232, a data frame detection unit 233, a despreading unit 234, an error determination unit 235, and an output control unit 236.

The synchronous frame detection unit 231 performs processing regarding detection of a synchronous frame. The readout unit 232 performs processing regarding readout of information from the memory 219. The data frame detection unit 233 performs processing regarding detection of the data frame. The despreading unit 234 performs processing regarding despreading. The error determination unit 235 performs processing regarding error determination. The output control unit 236 performs processing regarding information output control.

Also, as illustrated in FIG. 10B, the synchronous frame detection unit 231 includes a known spread code generation unit 241, a fast Fourier transform unit 242, an inverse fast Fourier transform unit 243, a cross-correlation value calculation unit 244, and a frame head position detection unit 245.

The known spread code generation unit 241 performs processing regarding generation of a known spread code. The fast Fourier transform unit 242 performs processing regarding fast Fourier transform. The inverse fast Fourier transform unit 243 performs processing regarding inverse fast Fourier transform. The cross-correlation value calculation unit 244 performs processing regarding calculation of a cross-correlation value. The frame head position detection unit 245 performs processing regarding detection of the frame head position.

Also, as illustrated in FIG. 10C, the data frame detection unit 233 includes a carrier frequency correction unit 251, a frame head position detection unit 252, a frame extraction unit 253, a parameter calculation unit 254, a frequency initial phase correction unit 255, an addition unit 256, and a control unit 257.

The carrier frequency correction unit 251 performs processing regarding correction of the carrier frequency. The frame head position detection unit 252 performs processing regarding detection of a frame head position. The frame extraction unit 253 performs processing regarding frame extraction. The parameter calculation unit 254 performs processing regarding parameter calculation. The frequency initial phase correction unit 255 performs processing regarding correction of a frequency and an initial phase. The addition unit 256 performs processing regarding addition of data. The control unit 257 performs processing regarding processing control.

Also, as illustrated in FIG. 11A, the frame head position detection unit 252 includes a known spread code generation unit 261, a fast Fourier transform unit 262, an inverse fast Fourier transform unit 263, a cross-correlation value calculation unit 264, and a peak detection unit 265.

The known spread code generation unit 261 performs processing regarding generation of a known spread code. The fast Fourier transform unit 262 performs processing regarding fast Fourier transform. The inverse fast Fourier transform unit 263 performs processing regarding inverse fast Fourier transform. The cross-correlation value calculation unit 264 performs processing regarding calculation of a cross-correlation value. The peak detection unit 265 performs processing regarding peak detection.

Also, as illustrated in FIG. 11B, the peak detection unit 265 includes a frame counter control unit 271, a mask control unit 272, a cross-correlation value maximum value detection unit 273, a peak setting unit 274, and a rearrangement unit 275.

The frame counter control unit 271 performs processing regarding control of a frame counter. The mask control unit 272 performs processing regarding mask control. The cross-correlation value maximum value detection unit 273 performs processing regarding detection of a total-correlation value maximum value. The peak setting unit 274 performs processing regarding peak setting. The rearrangement unit 275 performs processing regarding rearrangement of the cross-correlation values.

Also, as illustrated in FIG. 11C, the parameter calculation unit 254 includes a parameter provisional setting unit 281, a correlation value calculation unit 282, a parameter calculation unit 283, a control unit 284, and a parameter determination unit 285.

The parameter provisional setting unit 281 performs processing regarding provisional setting of a parameter. The correlation value calculation unit 282 performs processing regarding correlation value calculation. The parameter calculation unit 283 performs processing regarding parameter calculation. The control unit 284 performs processing regarding processing control. The parameter determination unit 285 performs processing regarding parameter determination.

<Flow of Reception Process>

Next, an example of a flow of a reception process executed by the above-described reception device 200 is described with reference to a flowchart in FIG. 12.

When the reception process is started, the low noise amplification unit 212 receives the wireless signal (transmission signal TX) transmitted from the transmission device 100 via the antenna 211 at step S201. Meanwhile, in a case where the wireless signal cannot be received, the reception process is finished. That is, substantially, this reception process is executed only in a case where the transmission device 100 is located within a range in which this may perform wireless communication.

At step S202, the low noise amplification unit 212 amplifies the reception signal being the wireless signal received at step S201.

At step S203, the band-pass filter 213 removes an unnecessary frequency component from the reception signal amplified by the low noise amplification unit 212.

At step S204, the carrier oscillation unit 214 oscillates at a predetermined frequency to generate the carrier signal.

At step S205, the multiplication unit 215 multiplies the reception signal by the carrier signal, thereby generating the I signal.

At step S206, the 90-degree shifter 216 shifts the phase of the carrier signal by 90 degrees. Then, the multiplication unit 217 multiplies the reception signal by the 90-degree phase-shifted carrier signal, thereby generating the Q signal.

At step S207, the A/D converter 218 A/D converts the I signal generated by the multiplication unit 215 and the Q signal generated by the multiplication unit 217, respectively.

At step S208, the memory 219 stores the digital data of the I signal and the digital data of the Q signal generated by the A/D converter 218, respectively.

At step S209, the CPU 202 reads out the digital data of the I signal and the digital data of the Q signal from the memory 219 and decodes them.

When the process at step S209 is finished, the reception process is finished. Meanwhile, the reception device 200 performs the above-described reception process on all the frames transmitted from the transmission device 100.

<Flow of Decoding Process>

Figure 12:
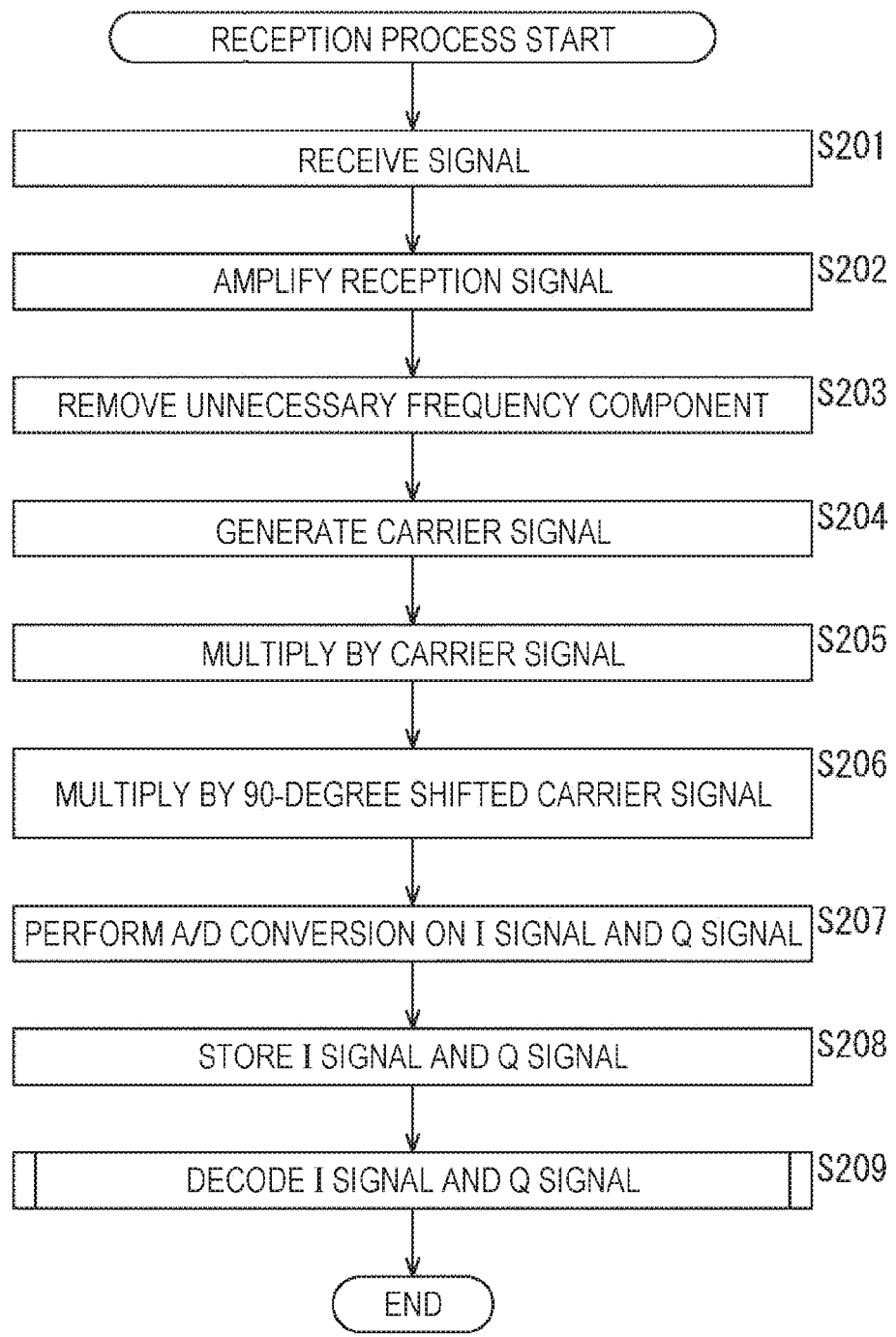
FIG. 12 is a flowchart illustrating an example of a flow of a reception process.

Next, an example of a flow of a decoding process executed at step S209 in FIG. 12 is described with reference to a flowchart in FIG. 13.

When the decoding process is started, at step S221, the synchronous frame detection unit 231 detects the synchronous frame. There is possibility that slight frequency shift occurs in the oscillation frequency of the carrier oscillation unit 214 depending on environmental temperature. Therefore, in the process at step S221, it is possible to realize highly reliable detection by detecting the synchronous frame of which all data are known.

Also, the synchronous frame detection unit 231 measures the environmental temperature, estimates subtle deviation of the carrier frequency, and corrects the same. For example, assuming that the frequency deviation estimated from the environmental temperature is s, the synchronous frame detection unit 231 performs operations of following equations (1) and (2) to correct the frequency shift of the I signal and the Q signal.

[Equation 1]

$$I'(t)=I(t)\times\cos(2\pi\varepsilon t)-Q(t)\times\sin(2\pi\varepsilon t) \quad (1)$$

[Equation 2]

$$Q'(t)=I(t)\times\sin(2\pi\varepsilon t)+Q(t)\times\cos(2\pi\varepsilon t) \quad (2)$$

In equation (1), I'(t) represents a sample value of the corrected I signal at time t. Also, in equation (2), Q' (t) is a sample value of the corrected Q signal at time t.

At step S222, the synchronous frame detection unit 231 determines whether the synchronous frame is detected in the process at step S221. In a case where it is determined that the synchronous frame is not detected, the procedure returns to step S221. Also, in a case where it is determined that the synchronous frame is detected, the procedure shifts to step S223.

At step S223, the readout unit 232 reads out the reception signal of the predetermined time TG before the detected synchronous frame from the memory 219. That is, the reception signal of time equal to or longer than the predetermined time TG is stored in the memory 219. The readout unit 232 reads out the reception signal of the predetermined time TG just before the synchronous frame from the memory 219. The readout unit 232 stores the readout reception signal in the register 221 to hold. By doing so, it is possible to perform the processing regarding the decoding of the reception signal in parallel with writing of the reception signal in the memory 219. That is, the reception device 200 may decode the reception signal while receiving the signal.

At step S224, the data frame detection unit 233 detects the data frame from the reception signal of predetermined time TG held in the register 221. In this case, it is ensured that this reception signal includes four data frames. Therefore, the data frame detection unit 233 detects four data frames from the reception signal.

At step S225, the despreading unit 234 multiplies a Gold code by each detected data frame and integrating the same to inversely spread the same.

At step S226, the error determination unit 235 determines an error by performing CRC operation on the inversely spread data frame.

At step S227, if no error is detected in the error determination at step S226, the output control unit 236 extracts the weather observation data TM from each data frame and outputs the same as decoded data.

When the process at step S227 is finished, the procedure returns to FIG. 12.

<Flow of Synchronous Frame Detection Process>

Figure 13:
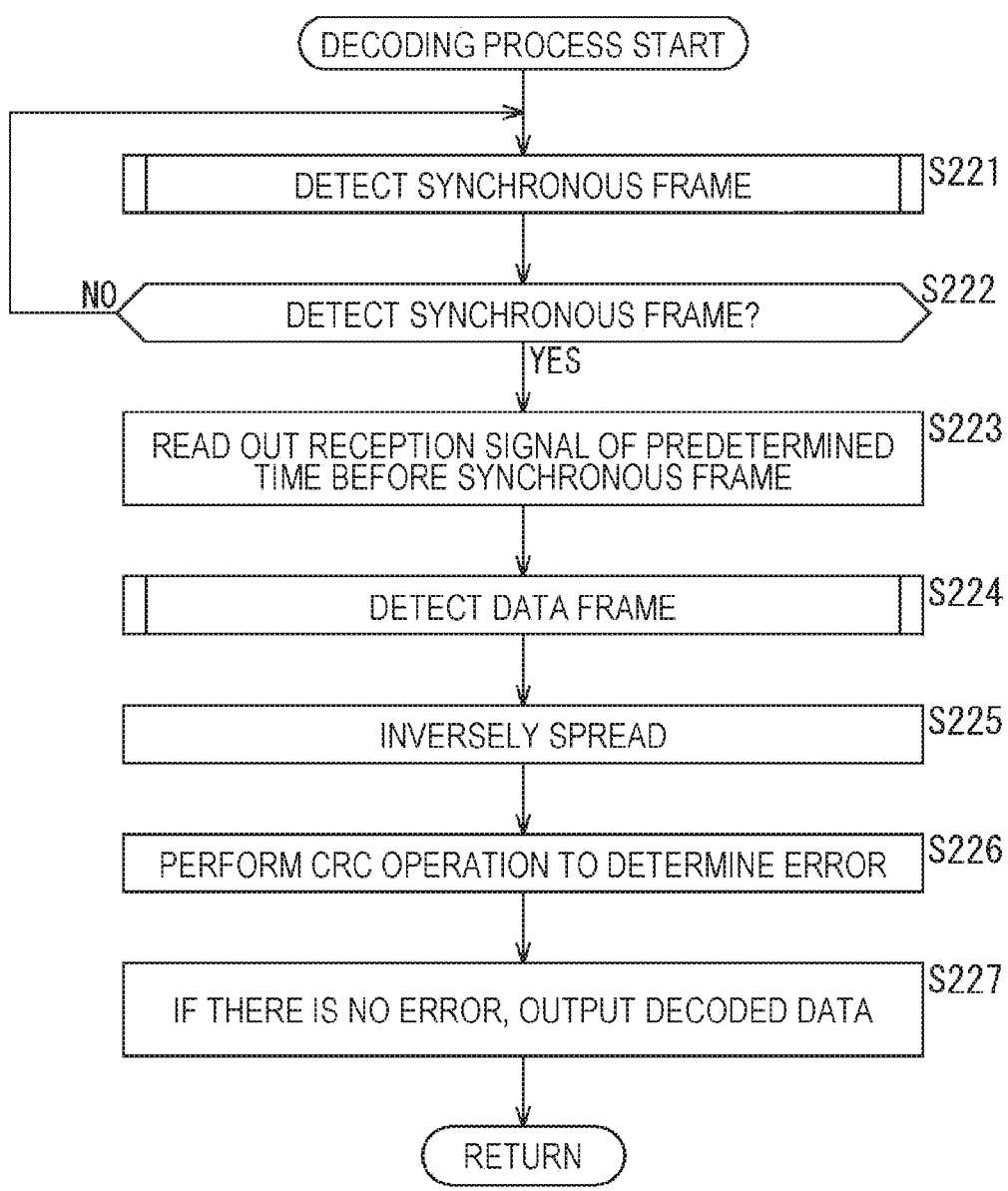
FIG. 13 is a flowchart illustrating an example of a flow of a decoding process.

Next, an example of a flow of a synchronous frame detection process executed at step S221 in FIG. 13 is described with reference to a flowchart in FIG. 14.

In the reception signal stored in the memory 219, a signal level is low and the transmitted signal is buried in noise, so that it is not possible to find the head position of the frame by the conventional method. Therefore, in this embodiment, the synchronous frame all data of which are known is used.

When the synchronous frame detection process is started, at step S241, the known spread code generation unit 241 generates the known spread code of the synchronous frame. That is, a signal waveform transmitted from the transmission device 100 as the synchronous frame is reproduced by the reception device 200. For example, the known spread code generation unit 241 replaces "0" and "1" of bits of transmission data in the synchronous frame with "+1" and "−1", respectively, to create a known spread code ref(t,n).

At step S242, the fast Fourier transform unit 242 obtains a complex spectrum R(k,n) by performing the fast Fourier transform FFT on the known spread code ref(t,n).

At step S243, the fast Fourier transform unit 242 obtains a complex reception signal spectrum S (k) by performing the fast Fourier transform on an IQ signal (I'(t),Q'(t)). Herein, both R(k) and S (k) are complex spectra.

At step S244, the inverse fast Fourier transform unit 243 performs the inverse fast Fourier transform, sets a minute shift ζ of the frequency, and obtains a cross-correlation value c(t,ζ) as a multiplication of the complex spectra.

This total correlation value is calculated using the FFT operation as in following equation (3).

[Equation 3]

$$c(t,\zeta)=\text{IFFT}\{R(k\cdot\zeta)\cdot S^*(k)\} \quad (3)$$

Herein, IFFT represents the inverse fast Fourier transform and $S^*(k)$ represents a complex conjugate component of $S(k)$. Herein, as the operation of the frequency shift ζ, the operations represented by equations (1) and (2) must be performed, which requires very long operation time. However, by using the FFT and the IFFT, the frequency shift operation is replaced with a readout position shift of an array. Therefore, the operation of equation (3) may be performed at a high speed. Also, S (k) represents a signal passing through the band-pass filter. Therefore, a result of the multiplication operation (R(k−ζ) and S*(k)) in equation (3) is 0 outside a range of a frequency domain limited in advance. Therefore, the operation of equation (3) may be executed at a high speed.

By using the fast Fourier transform (FFT) and the inverse fast Fourier transform (IFFT) in this manner, it is possible to perform correlation operation at a high speed.

There is possibility that the minute shift of the frequency varies depending on the frame head position. Therefore, at step S245, the cross-correlation value calculation unit 244 adds an absolute value of c(t,ζ) while sequentially shifting the value of the minute shift ζ as represented in following equation (4), thereby obtaining a cross-correlation value α(t) at time t.

[Equation 4]

$$\alpha(t)=\Sigma_{\zeta=-\gamma}^{+\gamma}|c(t,\zeta)|^2 \quad (4)$$

At step S246, the frame head position detection unit 245 detects a head position Tbs of the synchronous frame by finding time t at which the cross-correlation value α(t) reaches its peak.

Figure 15A:
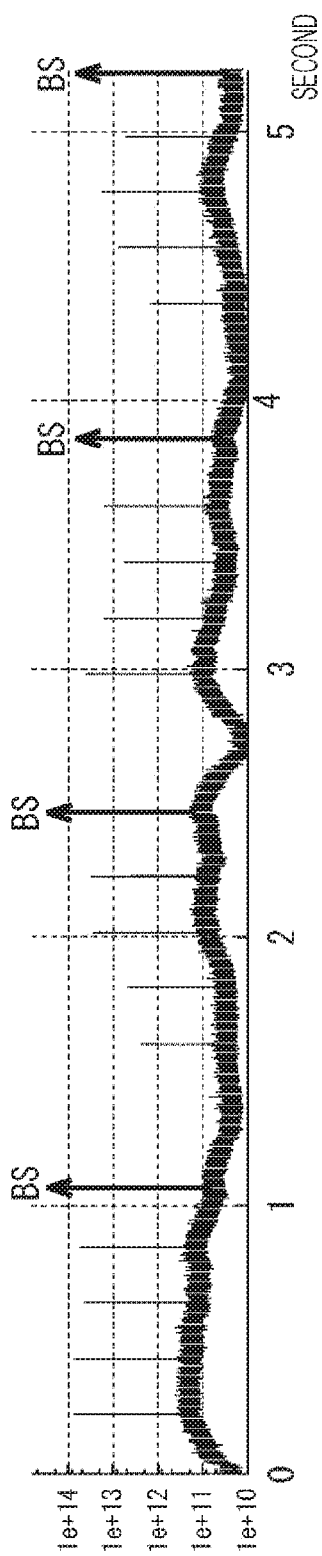
FIGS. 15A and 15B are views illustrating an example of a frame detection result.

FIG. 15A is a view illustrating a plot example of the head position of the synchronous frame obtained in this manner. In a waveform illustrated in FIG. 15A, an arrow of a portion represented as "BS" indicates the head position of the synchronous frame. As illustrated in FIG. 15A, in this case, the head position of the synchronous frame is detected approximately every predetermined time TG (1.2 seconds).

When the process at step S246 is finished, the synchronous frame detection process is finished, and the procedure returns to FIG. 13.

<Flow of Data Frame Detection Process>

Next, an example of a flow of a data frame detection process executed at step S224 in FIG. 13 is described with reference to a flowchart in FIG. 16.

When the data frame detection process is started, the carrier frequency correction unit 251 performs carrier frequency correction at step S261. There is possibility that slight frequency shift occurs in the oscillation frequency of the carrier oscillation unit 214 depending on environmental temperature. Therefore, the carrier frequency correction unit 251 measures the environmental temperature, estimates the subtle deviation of the carrier frequency, and corrects the same.

For example, the carrier frequency correction unit 251 performs the operations of satisfied equations (1) and (2) to correct the frequency shift of the I signal and the Q signal.

At step S262, the frame head position detection unit 252 detects the head position of the data frame.

At step S263, the frame extraction unit 253 cuts out one-frame reception signals (I signal and Q signal) from the frame head position detected at step S262. Meanwhile, the number of the detected frame is set to n.

At step S264, the parameter calculation unit 254 executes a parameter calculation process, calculates a correlation value between the I signal and the Q signal cut out at step S263 and the synchronous signal (SYNC) and obtains β(n). The parameter calculation unit 254 also obtains a frequency correction value γ(n) and an initial phase G(n) that maximize the correlation value β(n), respectively.

At step S265, the frequency initial phase correction unit 255 performs frequency correction and correction of the initial phase on the reception signal using the frequency correction value γ(n) and the initial phase θ(n) calculated at step S264.

At step S266, the addition unit 256 adds the reception signal corrected at step S265 to the frame data. At that time, the addition unit 256 weights the reception signal to be added using the correlation value β(n) as a weight coefficient.

At step S267, the control unit 257 determines whether all the frames are processed. In a case where it is determined that there is a frame not yet processed, the procedure returns to step S262 and subsequent processes are repeated. For each frame, each of the processes at step S262 to step S267 is executed and in a case where it is determined at step S267 that all the frames are processed, the data frame detection process is finished and the procedure returns to FIG. 13.

<Flow of Frame Head Position Detection Process>

Figure 16:
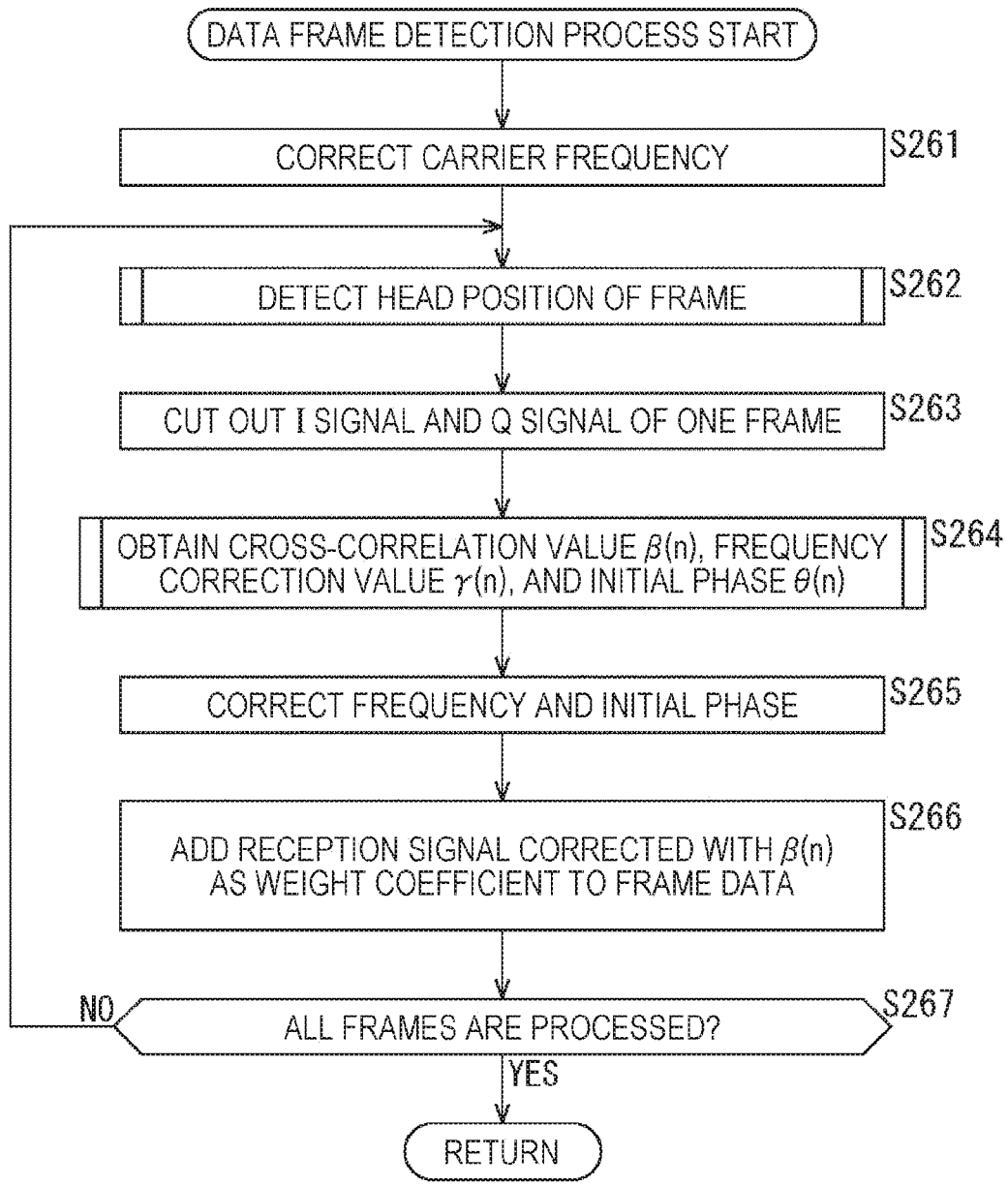
FIG. 16 is a flowchart illustrating an example of a flow of a data frame detection process.

Next, an example of a flow of a frame head position detection process executed at step S262 in FIG. 16 is described with reference to a flowchart in FIG. 17.

Figure 14:
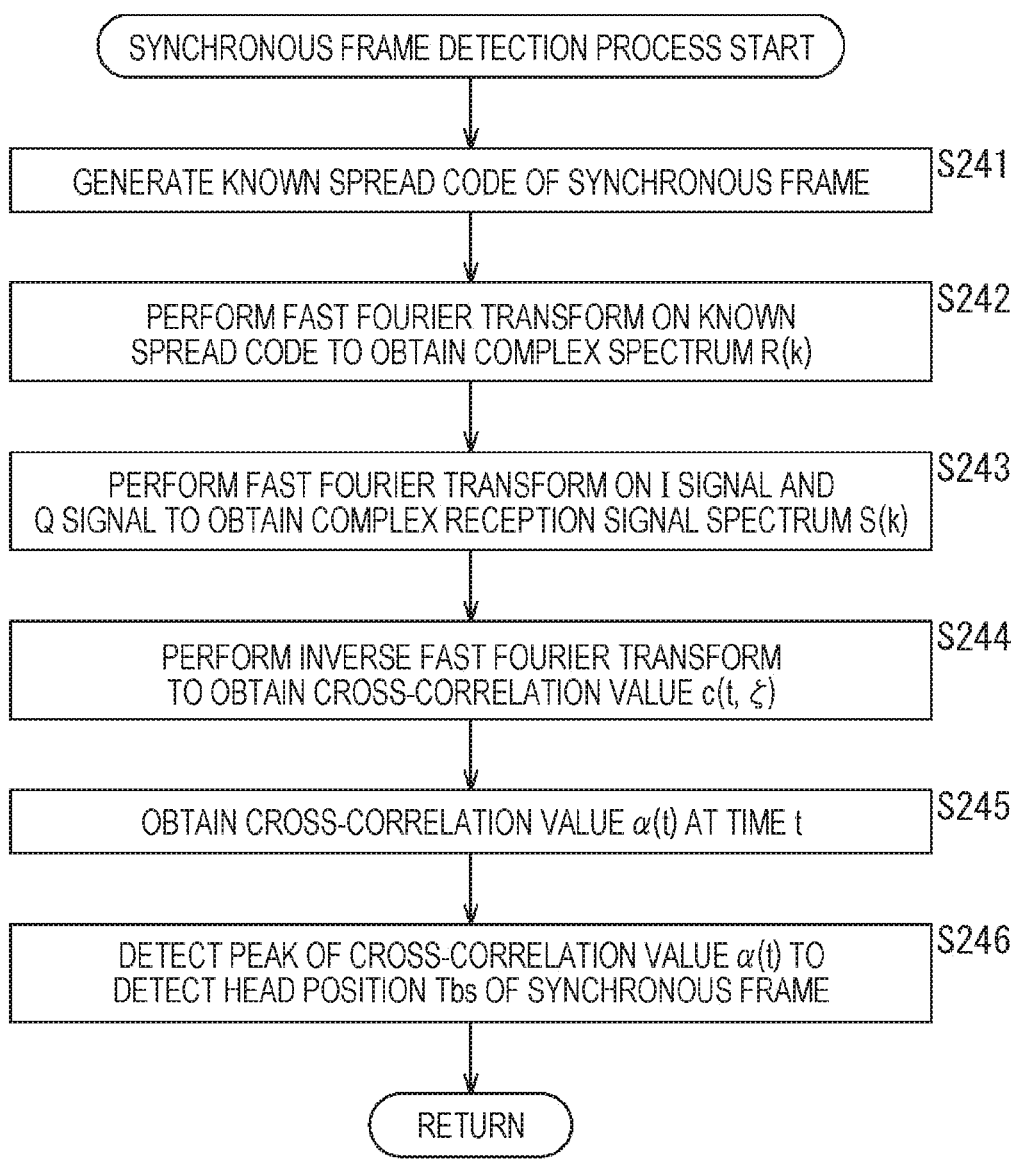
FIG. 14 is a flowchart illustrating an example of a flow of a synchronous frame detection process.

Since the start position Tbs of the synchronous frame is known by the synchronous frame detection process in FIG. 14, this process is performed on the data TG seconds before Tbs. When the frame head position detection process is started, the known spread code generation unit 261 generates the known spread code ref(t,n) using a synchronous pattern (SYNC) at step S281. A method of generating this known spread code ref(t,n) is similar to that at step S241 in FIG. 14 except that this uses only a synchronous (SYNC) signal domain.

At step S282, the fast Fourier transform unit 262 performs the fast Fourier transform FFT on the known spread code ref(t,n) as in the case at step S242 in FIG. 14, thereby obtaining the complex spectrum R(k,n).

At step S283, the fast Fourier transform unit 262 performs the fast Fourier transform on the IQ signal (I'(t),Q'(t)) as in the case at step S243 in FIG. 14, thereby obtaining the complex reception signal spectrum S(k).

At step S284, the inverse fast Fourier transform unit 263 carries out the inverse fast Fourier transform, sets the minute shift of the frequency and obtains the cross-correlation value c(t,Z) as the multiplication of the complex spectra as in the case at step S244 in FIG. 14.

Therefore, also in this case, correlation operation may be performed at a high speed by using fast Fourier transform (FFT) and inverse fast Fourier transform (IFFT).

At step S285, the cross-correlation value calculation unit 264 adds the absolute value of c(t,ζ) while sequentially shifting the value of the minute shift ζ as in the case at step S245 in FIG. 14, thereby obtaining the cross-correlation value α(t) at time t.

At step S286, the peak detection unit 265 finds the peak of the cross-correlation value α(t), thereby detecting the frame head position. Herein, the cross-correlation value in an nth frame is set to β(n). If time when α(t) reaches its peak is tn, a relationship between α(t) and β(n) may be expressed by following equation (5).

[Equation 5]

$$\beta(n) = \alpha(tn) \quad (5)$$

Figure 15B:
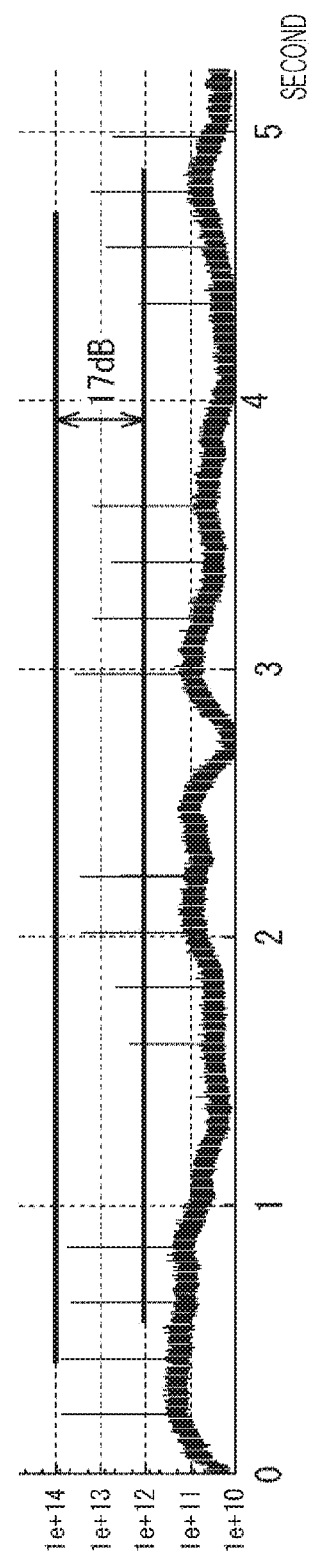

FIG. 15B is a view illustrating a plot example of β(n) obtained by performing operation in this manner. In the example of FIG. 15B, the frame head position is detected approximately every 0.3 seconds. Also, the peak level fluctuates greatly depending on a radio wave condition.

When the process at step S286 is finished, the frame head position detection process is finished, and the procedure returns to FIG. 16.

<Flow of Peak Detection Process>

Figure 17:
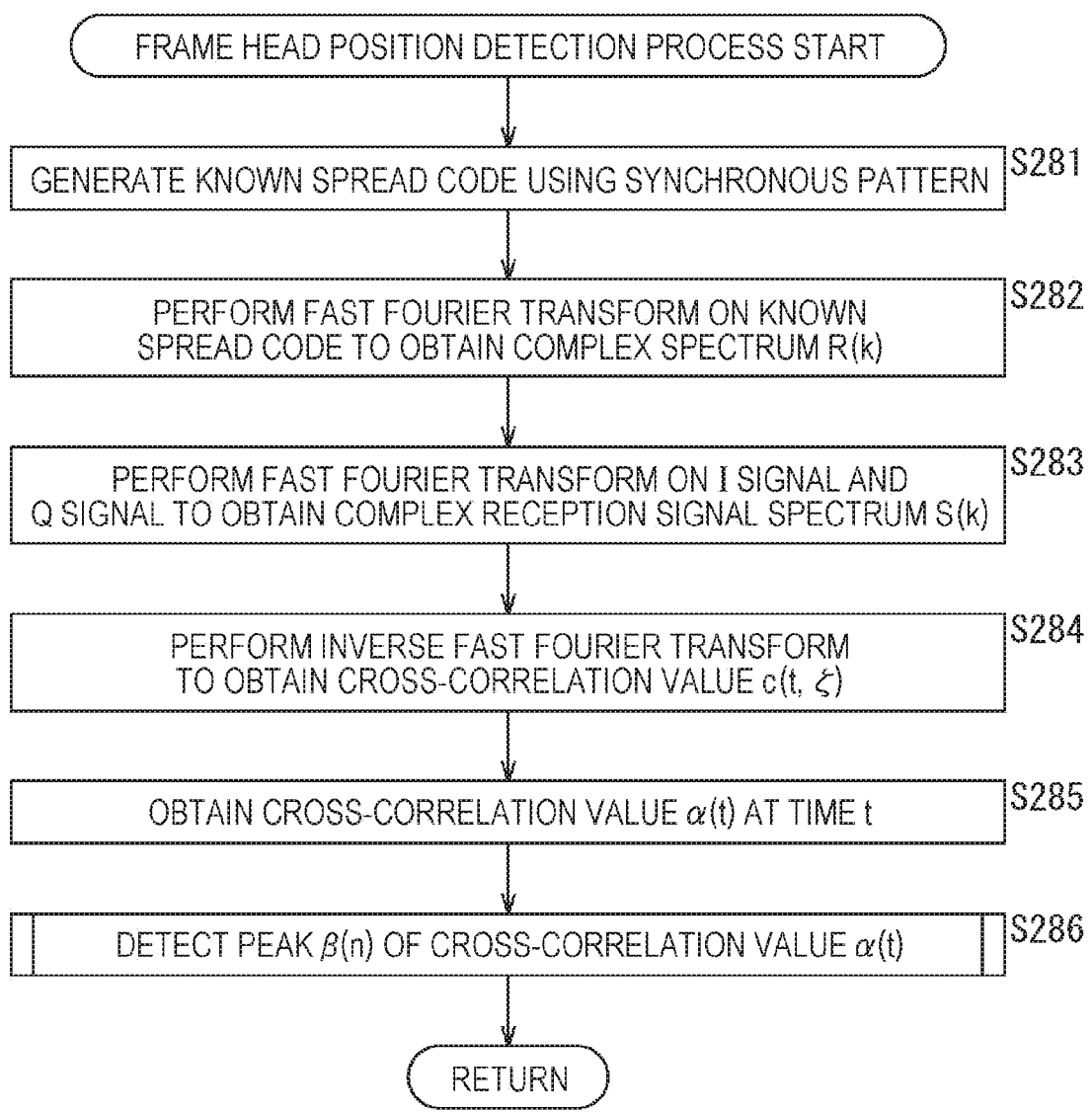
FIG. 17 is a flowchart illustrating an example of a flow of a frame head position detection process.
Figure 18:
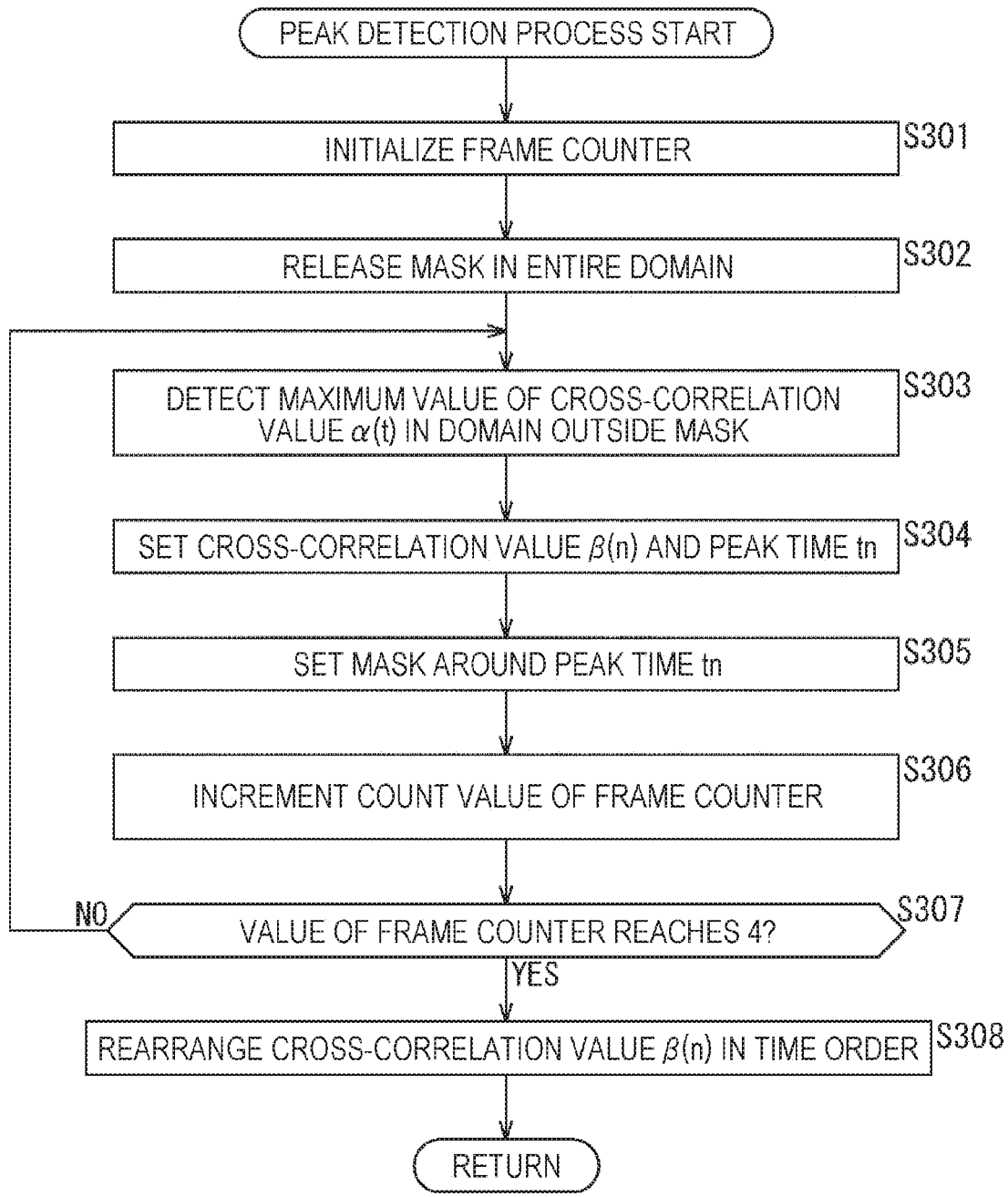
FIG. 18 is a flowchart illustrating an example of a flow of a peak detection process.

Next, an example of a flow of a peak detection process executed at step S286 in FIG. 17 is described with reference to a flowchart in FIG. 18.

When the peak detection process is started, the frame counter control unit 271 initializes a value of a frame counter n to 0 at step S301.

At step S302, the mask control unit releases a mask in an entire domain of the predetermined time TG. The mask is a time domain for excluding peak detection to be described later.

At step S303, the cross-correlation value maximum value detection unit 273 detects a maximum value of the cross-correlation value α(t) in the entire time domain in which the mask is not set. Time when the cross-correlation value α(t) becomes the maximum is the time considered to be the head of the frame.

Therefore, at step S304, the peak setting unit 274 stores this time as tn. Also, the peak setting unit 274 stores the peak of the correlation value as β(n)=α(tn). That is, the peak setting unit 274 sets the cross-correlation value β(n) and the peak time tn.

If the detected peak position is the head of the frame, there is no other frame 0.2 seconds before and after the same.

Therefore, at step S305, the mask control unit 272 sets the mask 0.2 seconds before and after the peak detected at step S303.

Next, at step S306, the frame counter control unit 271 adds "1" to the value of the frame counter n and updates the same.

At step S307, the frame counter control unit 271 determines whether the value of the frame counter n reaches "4". That is, the frame counter control unit 271 determines whether the detection of four frames that are supposed to be present in the predetermined time TG is finished.

If it is determined that the value of the frame counter n does not reach 4 and that detection of the supposed four frames is not finished, the procedure returns to step S303 and the subsequent processes are repeated. That is, the maximum value detection as described above is performed again. Meanwhile, in this case, the mask is set by the process at step S305 to the time when the frame head is already found. Therefore, the cross-correlation value maximum value detection unit 273 detects the maximum value while avoiding the already set mask.

As described above, the maximum value detection is repeatedly performed, and in a case where it is determined that four peaks are found at step S307, the procedure shifts to step S308.

By the above-described processes, the order stored in β(n) is descending order of the peak of α(tn). Therefore, at step S308, the rearrangement unit 275 rearranges the order of β(n) in the order of peak occurrence.

When the process at step S308 is finished, the peak detection process is finished, and the procedure returns to FIG. 17.

As described above, by finding the frame head position in descending order of the peak, the peak detection unit 265 may more accurately find the frame head position even in a case where the SNR is low.

<Flow of Parameter Calculation Process>

Figure 19:
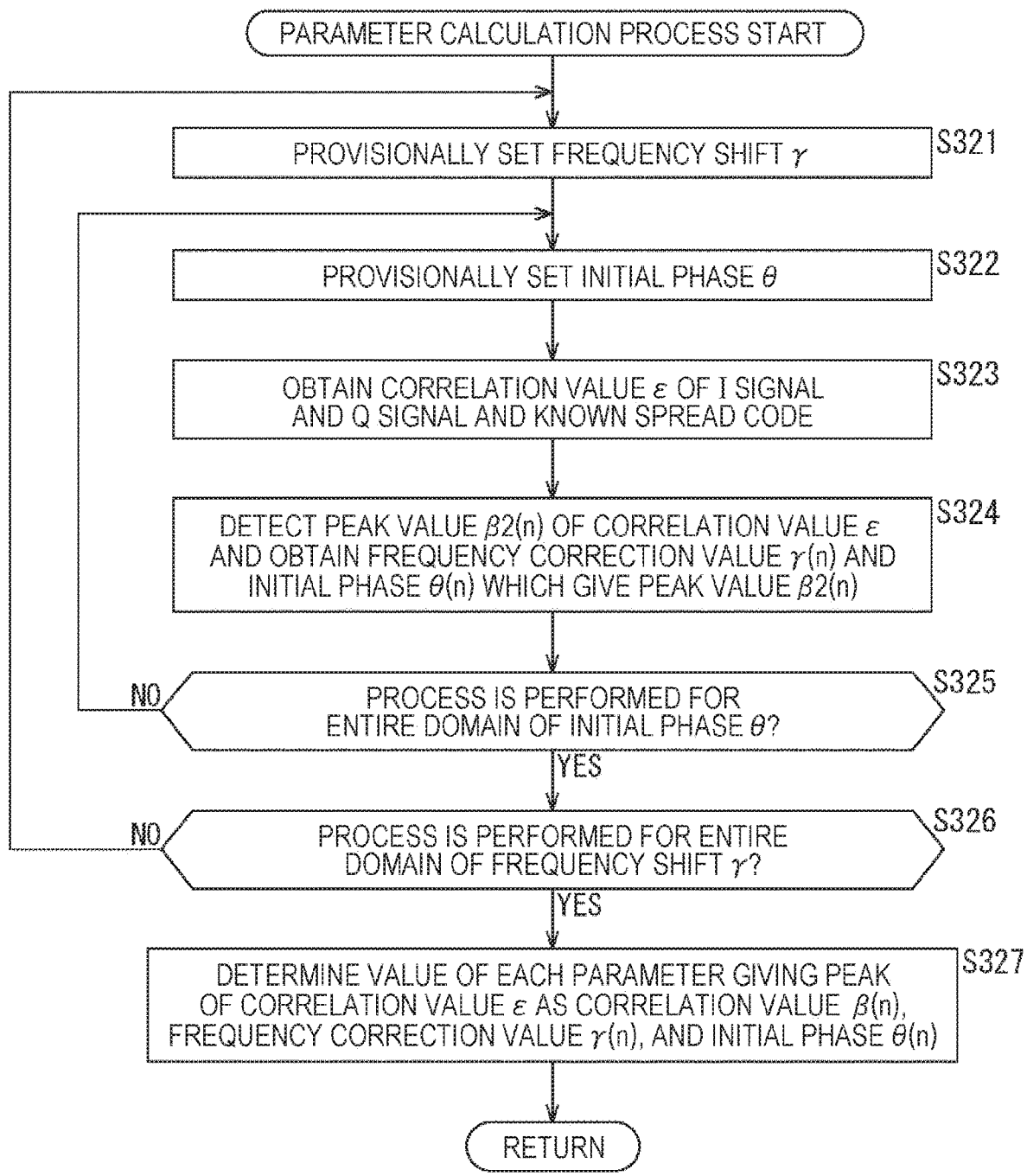
FIG. 19 is a flowchart illustrating an example of a flow of a parameter calculation process.

Next, an example of a flow of a parameter calculation process executed at step S264 in FIG. 16 is described with reference to a flowchart in FIG. 19.

When the parameter calculation process is started, the parameter provisional setting unit 281 provisionally sets a value of frequency shift γ(n) for the I signal and the Q signal cut out for each frame at step S321. For example, the parameter provisional setting unit 281 sets from −50 Hz to +50 Hz at 5 Hz intervals as the provisionally set value of γ.

At step S322, the parameter provisional setting unit 281 provisionally sets a value of the initial phase θ(n). For example, the parameter provisional setting unit 281 sets values from −180 degrees to +160 degrees at 20-degree intervals as the provisionally set value of θ.

At step S323, the correlation value calculation unit 282 performs operation of a correlation value ε(γ,θ) between the cut out I signal and Q signal and the known spread code ref(t,n) of only a synchronous portion on the basis of the provisional frequency shift γ set at step S321 and the provisional initial phase θ set at step S322.

At step S324, the parameter calculation unit 283 obtains a peak value of the correlation value ε(γ,θ) as β2(n). Also, the parameter calculation unit 283 obtains the values of γ and θ that give the peak of the correlation value ε(γ,θ) as the frequency correction value γ(n) and the initial phase θ(n), respectively.

At step S325, the control unit 284 determines whether the process is performed on the entire domain of the initial phase θ. In a case where it is determined that there is the domain not yet processed, the procedure returns to step S322 and subsequent processes are repeated. Each of the processes at steps S322 to S325 is repeatedly executed, and in a case where it is determined at step S325 that the process is performed on the entire domain of the initial phase θ, the procedure shifts to step S326.

At step S326, the control unit 284 determines whether the process is performed on the entire domain of the frequency shift γ. In a case where it is determined that there is the domain not yet processed, the procedure returns to step S321 and the subsequent processes are repeated. Each of the processes at steps S321 to S326 is repeatedly executed, and in a case where it is determined at step S326 that the process is performed on the entire domain of the frequency shift γ, the procedure shifts to step S327.

At step S327, the parameter determination unit 285 determines the values of each of the parameters that gives the peak of the correlation value ε as the correlation value β(n), the frequency correction value γ(n), and the initial phase θ(n).

When the process at step S327 is finished, the parameter calculation process is finished, and the procedure returns to FIG. 16.

The three values β2(n), γ(n), and θ(n) obtained by the above-described process are the values with the largest correlation value with the known spread code ref(t,n).

Figure 20:
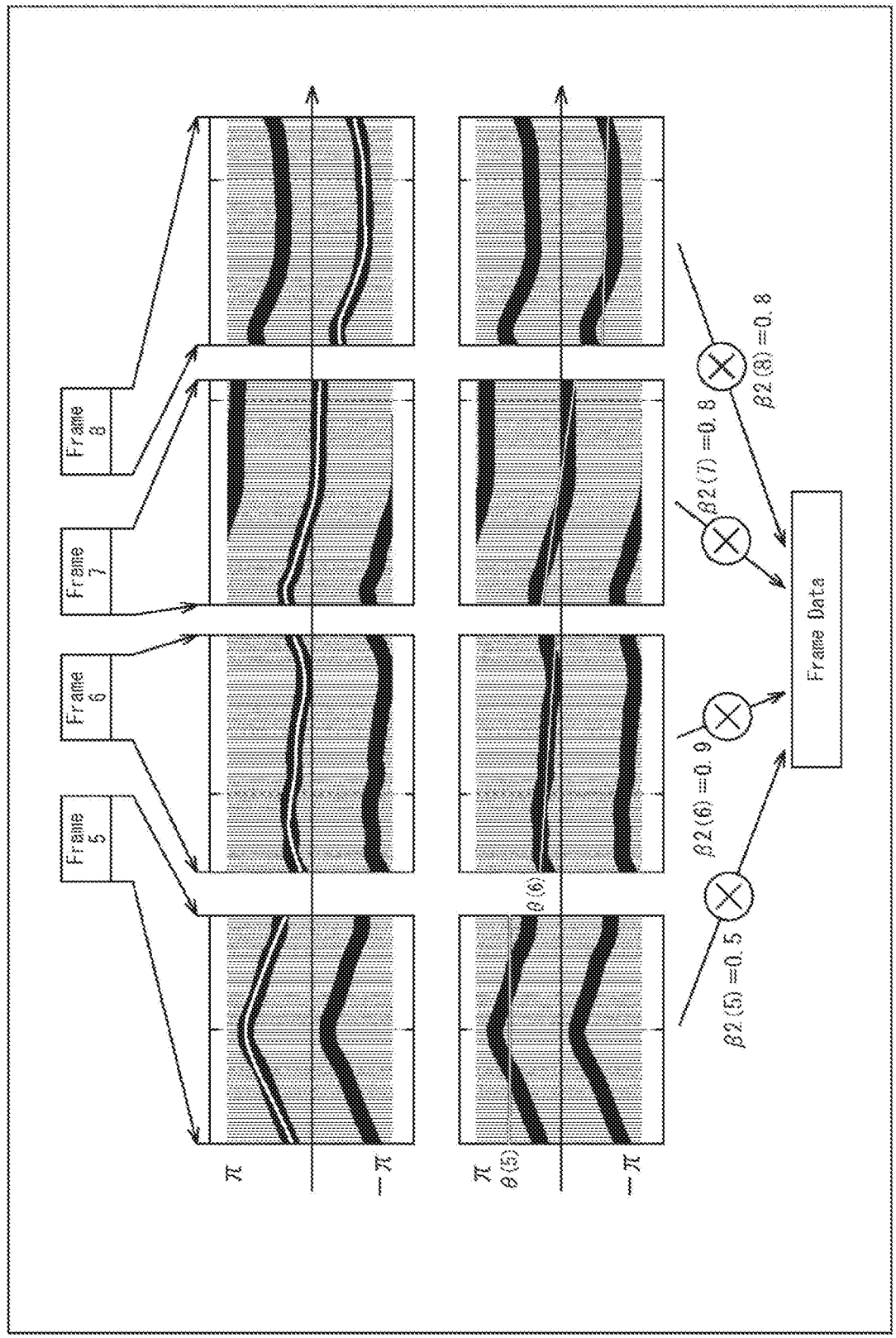
FIG. 20 is a view illustrating an example of a state of approximation of phase fluctuation.

An upper stage in FIG. 20 illustrates an example of phase change in the frame of 0.2 seconds experimentally observed. In FIG. 20, frames 5 (Frame 5) to 8 (Frame 8) are extracted and displayed in which the phases and frequencies are slightly changed. By executing the parameter calculation process as described above, the parameter calculation unit 254 may obtain a straight line that approximates the best the phase change as illustrated in a lower stage of FIG. 20 with respect to the phase that is fluctuating in this manner.

In the lower stage in FIG. 20, an inclination of each straight line corresponds to γ(n), and the initial phase corresponds to θ(n). Also, the correlation value β2(n) changes in accordance with the correlation between the phase fluctuation and the approximate straight line.

The processes at steps described above may be executed in an arbitrary order, executed in parallel, and repeatedly executed as necessary.

As described above, by applying the transmission device 100 and the reception device 200, it is possible to set the maximum continuous transmission time to be short. For example, by setting to 0.2 seconds in the 920 MHz band, it is possible to select from many frequency channels to transmit, so that it is possible to construct a transmission/reception system more robust over crosstalk. Also by integrating many short-time frames, an effective SNR may be improved without exceeding the limit of the maximum transmission time prescribed in the Radio Law. At that time, since the synchronous signal is distributed throughout the entire frame, even in a case where there is the phase fluctuation in the frame, it is possible to more appropriately correct the phase and the frequency. As a result of this, for example, the reception device 200 may decode more correctly even if the reception signal is buried in noise and is weak enough such that it is difficult to decode by the conventional method.

Also, a plurality of frames is integrated while multiplying the correlation coefficient β(n) as a weight, so that in a case where some frames are lost, some frames have large phase fluctuation, or some frames are erroneously detected or the like, the value of the correlation coefficient β(n) decreases, and the reception device 200 may decode more correct data while relaxing an influence thereof.

Figure 21:
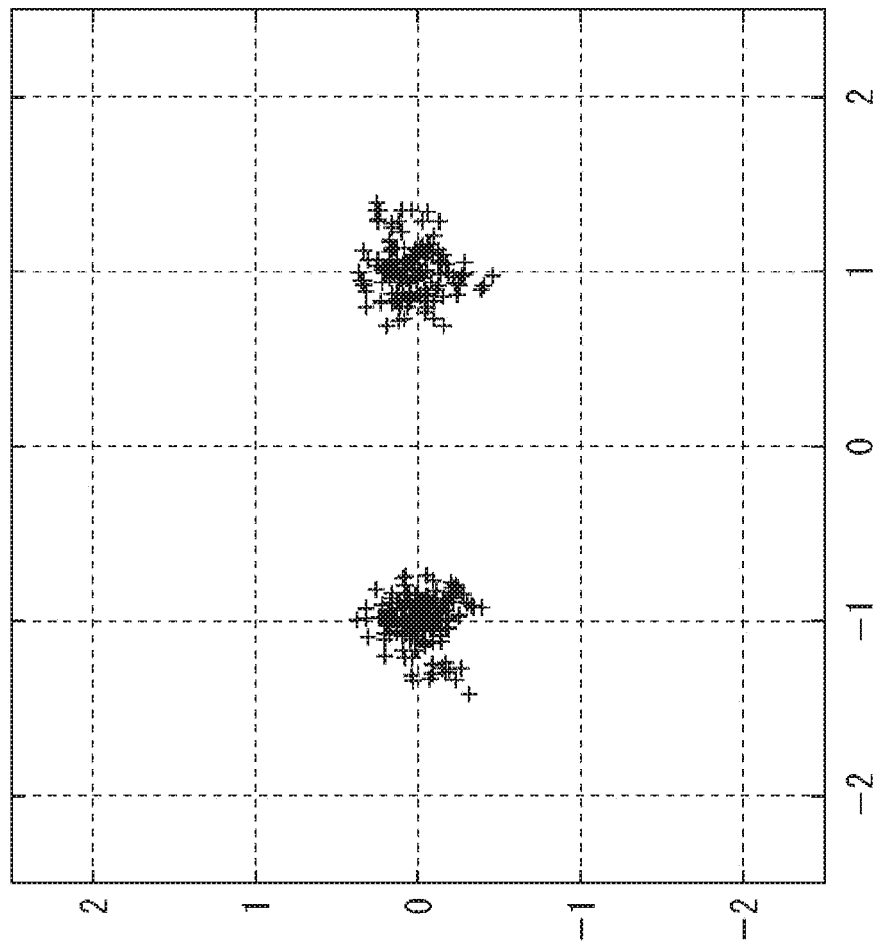
FIG. 21 is a view illustrating a decoding result.

FIG. 21 illustrates a constellation of a result of transmitting and receiving by the transmission device 100 and the reception device 200 to which the present technology is applied to decode. As illustrated in FIG. 21, since two points are separated as BPSK modulation, the data is correctly decoded in this case.

In the above description, the example in which the frame of 0.2 seconds is transmitted 100 times for five minutes is described, but the numerical values are examples and are not limited to this example. For example, the number of frames to be transmitted may be changed as necessary. Also, the reception device 200 may return ACK information (reception confirmation information) to the transmission device 100, and the frame transmission may be aborted when the ACK information is returned.

By performing each process as described above, the reception device 200 may receive the wireless signal of the data of each frame, store the reception signal which is the received wireless signal, detect the synchronous frame from the stored reception signal of predetermined time or longer, and detect the data frame from the stored reception signal of predetermined time before the synchronous frame when the synchronous frame is detected.

Therefore, the reception device 200 may detect the data frame with higher accuracy. That is, the reception device 200 may inhibit the deterioration in the reception sensitivity.

<Others>

Meanwhile, as in the case of the first embodiment, the numerical values such as the time and the number of times described above are merely examples and are not limited to the example described above.

Also, the data received by the reception device 200 is arbitrary, and is not limited to the weather observation data described above. That is, the reception device 200 may be applied to an arbitrary system, and may also be applied to a system other than the system for observing weather data described above.

Also, the configuration of the reception device 200 is not limited to the example in FIG. 9. For example, a memory which holds the reception signal read out from the memory 219 by the readout unit 232 may be separately provided outside the CPU 202.

Meanwhile, in the above description, it is described that the synchronous frame is transmitted after the data frame in the group, but the position of the synchronous frame may be other than this, for example. For example, the synchronous frame may be transmitted before the data frame, or the synchronous frame may be transmitted between a plurality of data frames. Also, a plurality of synchronous frames may be transmitted in one group. For example, two synchronous frames may be provided in one group, a first synchronous frame may be transmitted first, then each data frame may be transmitted, and finally a second synchronous frame may be transmitted.

Also, charp modulation may be performed on the transmission signal TX transmitted by the transmission device 100. The chirp modulation is a modulation scheme that changes the frequency of the carrier signal subjected to primary modulation at consecutive frequencies according to time to expand the band. In this manner, by spreading the band, it is possible to inhibit the influence of interference and the like caused by some frequencies. Meanwhile, the transmission signal TX may be subjected to frequency hopping (FH) modulation in which the frequency is randomly changed. Also, the synchronous frame and the data frame may be transmitted in the frequency bands different from each other.

The transmission device 100 and the reception device 200 to which the present technology is applied described above may be applied to an arbitrary system. For example, this may be applied to a user position monitoring system that monitors a position of a user such as an elderly person, an antitheft system of a car, a motorcycle and the like, and a system which controls flight, imaging and the like of an unmanned aircraft that can fly autonomously and fly by being remotely operated by a user. That is, the present technology may be applied to any system as long as it is a system involving communication. For example, the present technology may be applied to systems in all fields such as traffic, medical care, security, agriculture, beauty care, factory, and household appliance.

3. Third Embodiment

<Computer>

It is possible that the above-described series of processes is executed by hardware or executed by software. When a series of processes is performed by the software, a program which forms the software is installed on a computer. Herein, the computer includes a computer built in dedicated hardware, a general-purpose personal computer, for example, capable of executing various functions by various programs installed and the like.

Figure 22:
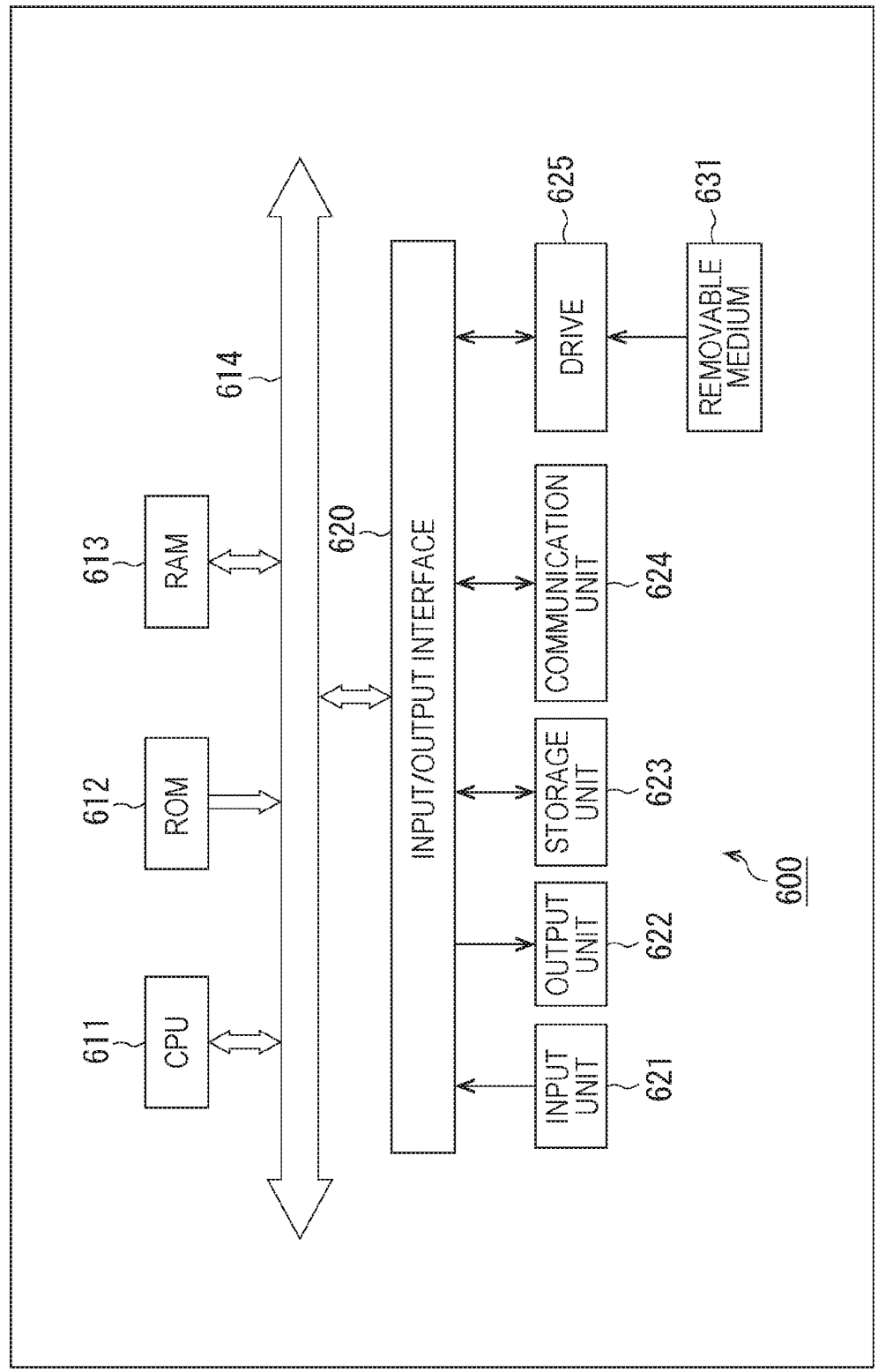
FIG. 22 is a block diagram illustrating a principal configuration example of a computer.

FIG. 22 is a block diagram illustrating a configuration example of hardware of a computer which executes the above-described series of processes by a program.

In a computer 600 illustrated in FIG. 22, a central processing unit (CPU) 611, a read only memory (ROM) 612, and a random access memory (RAM) 613 are connected to one another through a bus 614.

An input/output interface 620 also is connected to the bus 614. An input unit 621, an output unit 622, a storage unit 623, a communication unit 624, and a drive 625 are connected to the input/output interface 620.

The input unit 621 is formed of, for example, a keyboard, a mouse, a microphone, a touch panel, an input terminal and the like. The output unit 622 is formed of, for example, a display, a speaker, an output terminal and the like. The storage unit 623 is formed of, for example, a hard disk, a RAM disk, a nonvolatile memory and the like. The communication unit 624 is formed of a network interface and the like. The drive 625 drives a removable medium 631 such as a magnetic disk, an optical disk, a magnetooptical disk and a semiconductor memory.

In the computer configured in the above described manner, the CPU 611 loads the program stored in the storage unit 623, for example, on the RAM 613 through the input/output interface 620 and the bus 614 to execute, and thus, the above-described series of processes is performed. Data required for the CPU 611 to execute the various processes also are appropriately stored in the RAM 613.

The program executed by the computer (CPU 611) may be recorded in the removable medium 631 as a package medium and the like to be provided, for example. In this case, the program may be installed on the storage unit 623 through the input/output interface 620 by mounting the removable medium 631 on the drive 625.

The program may also be provided through a wired or wireless transmission medium such as a local area network, the Internet, and digital satellite broadcasting. In this case, the program may be received by the communication unit 624 to be installed on the storage unit 623.

In addition, the program may be installed in advance on the ROM 612 and the storage unit 623.

Meanwhile, the program executed by the computer may be the program of which processes are performed in chronological order in the order described in this specification or may be the program of which processes are performed in parallel or at required timing such as when a call is issued.

Also, in this specification, a step of describing the program recorded in the recording medium includes not only the processes performed in chronological order in the described order but also the processes executed in parallel or individually which are not necessarily performed in chronological order.

Also, the process at each step described above may be executed in each device described above or any device other than the above-described device. In this case, the device which executes the process may include a function (functional block and the like) required for executing the above-described process. Also, information required for the process may be appropriately transmitted to the device.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

It is also possible to divide the configuration described above as one device (or processor) into a plurality of devices (or processors). Other way round, it is also possible to put the configurations described above as a plurality of devices (or processors) together as one device (or processor). Also, of course, it is possible that a configuration other than the above-described one is added to the configuration of each device (or each processor). Furthermore, it is also possible that a part of the configuration of a certain device (or processor) is included in the configuration of another device (or another processor) as long as a configuration and operation as an entire system are substantially the same.

Although preferred embodiments of the present disclosure are described above in detail with reference to the attached drawings, the technical scope of the present disclosure is not limited to such examples. It is clear that one of ordinary skill in the technical field of the present disclosure may conceive of various modifications or corrections within the scope of the technical idea recited in claims and it is understood that they also naturally belong to the technical scope of the present disclosure.

For example, the present technology may be configured as cloud computing in which one function is shared by a plurality of devices through a network for processing in cooperation.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Also, the present technology is not limited thereto and may also be performed as any configuration mounted on a device forming such device or system, for example, a processor as a system large scale integration (LSI) and the like, a module using a plurality of processors and the like, a unit using a plurality of modules and the like, and a set obtained by adding still another function to the unit (that is to say, a partial configuration of the device).

Meanwhile, the present technology may also have following configurations.

(1) A signal processing device including:
a transmission unit which transmits data as a wireless signal for each frame;
a carrier sense unit which repeats carrier sense of a frequency band in which the transmission unit transmits the data; and
a transmission control unit which allows the transmission unit to transmit a data frame in the frequency band as the wireless signal in a case where the frequency band is vacant on the basis of a result of the carrier sense by the carrier sense unit, and further allows the transmission unit to transmit a synchronous frame formed of predetermined information different from the data frame in the frequency band as the wireless signal in a case where the transmission unit transmits the data frame predetermined number of times within first time.

(2) The signal processing device according to (1),
in which the carrier sense unit repeats the carrier sense every second time shorter than the first time.

(3) The signal processing device according to (1) or (2),
in which the synchronous frame is formed of information known by a reception side.

(4) The signal processing device according to any one of (1) to (3),
in which the synchronous frame is formed of a predetermined pseudo random number sequence determined in advance.

(5) The signal processing device according to any one of (1) to (4), further including:
a synchronous frame generation unit which generates the synchronous frame.

(6) The signal processing device according to any one of (1) to (5), further including:
a data frame generation unit which generates the data frame.

(7) The signal processing device according to (6),
in which the data frame generation unit generates a plurality of data frames using the same data, and
the transmission unit transmits the plurality of data frames generated by the data frame generation unit to transmit the same data a plurality of number of times.

(8) The signal processing device according to (6) or (7),
in which the data frame generation unit rearranges the data in the data frame such that a portion known by a reception side of the data frame is more evenly distributed in the data frame.

(9) A signal processing method of a signal processing device including:
transmitting data as a wireless signal for each frame;
repeating carrier sense of a frequency band in which the data is transmitted; and
transmitting a data frame in the frequency band as the wireless signal in a case where the frequency band is vacant on the basis of a result of the carrier sense, and further transmitting a synchronous frame formed of predetermined information different from the data frame as the wireless signal in the frequency band in a case where the data frame is transmitted predetermined number of times within first time.

(10) A program for allowing a computer to serve as:
a transmission unit which transmits data as a wireless signal for each frame;
a carrier sense unit which repeats carrier sense of a frequency band in which the transmission unit transmits the data; and
a transmission control unit which allows the transmission unit to transmit a data frame in the frequency band as the wireless signal in a case where the frequency band is vacant on the basis of a result of the carrier sense by the carrier sense unit, and further allows the transmission unit to transmit a synchronous frame formed of predetermined information different from the data frame in the frequency band as the wireless signal in a case where the transmission unit transmits the data frame predetermined number of times within first time.

(11) A signal processing device including:
a reception unit which receives a wireless signal of data for each frame;
a storage unit which stores a reception signal being the wireless signal received by the reception unit;
a synchronous frame detection unit which detects a synchronous frame from the reception signal of predetermined time or longer stored in the storage unit; and
a data frame detection unit which detects a data frame from the reception signal of the predetermined time before the synchronous frame stored in the storage unit in a case where the synchronous frame detection unit detects the synchronous frame.

(12) The signal processing device according to (11),
in which the synchronous frame is formed of information known by the signal processing device.

(13) The signal processing device according to (11) or (12),
in which the synchronous frame is formed of a predetermined pseudo random number sequence determined in advance.

(14) The signal processing device according to any one of (11) to (13), further including:
a readout unit which reads out the reception signal of the predetermined time before the synchronous frame stored in the storage unit from the storage unit in a case where the synchronous frame detection unit detects the synchronous frame, in which the data frame detection unit detects the data frame from the reception signal of the predetermined time before the synchronous frame read out by the readout unit.

(15) The signal processing device according to (14), in which the data frame detection unit detects a head position of the data frame in the reception signal of the predetermined time before the synchronous frame, cuts out one-frame data, and detects the data frame for each frame.

(16) The signal processing device according to (14) or (15) further including:

a holding unit which holds the reception signal of the predetermined time before the synchronous frame read out by the readout unit, in which the data frame detection unit detects the data frame from the reception signal of the predetermined time before the synchronous frame held by the holding unit.

(17) The signal processing device according to any one of (11) to (16), further including:

a despreading unit which multiplies the data frame detected by the data frame detection unit by a predetermined pseudo random number sequence and integrates to despread.

(18) The signal processing device according to any one of (11) to (17), in which the data frame detection unit omits detection of the data frame for the reception signal of the predetermined time before the synchronous frame in a case where the synchronous frame detection unit does not detect the synchronous frame.

(19) A signal processing method of a signal processing device including:

receiving a wireless signal of data for each frame;

storing a reception signal which is the received wireless signal;

detecting a synchronous frame from the stored reception signal of predetermined time or longer; and detecting a data frame from the stored reception signal of the predetermined time before the synchronous frame in a case where the synchronous frame is detected.

(20) A program for allowing a computer to serve as:

a reception unit which receives a wireless signal of data for each frame;

a storage unit which stores a reception signal being the wireless signal received by the reception unit;

a synchronous frame detection unit which detects a synchronous frame from the reception signal of predetermined time or longer stored in the storage unit; and a data frame detection unit which detects a data frame from the reception signal of the predetermined time before the synchronous frame stored in the storage unit in a case where the synchronous frame detection unit detects the synchronous frame.

REFERENCE SIGNS LIST

100 Transmission device
101 Data frame generation unit
102 Synchronous frame generation unit
103 Transmission control unit
104 Transmission unit
106 Carrier sense unit
121 Control unit
122 Selection unit
141 Amplification unit
142 Band-pass filter
143 Detection unit
200 Reception device
201 Reception unit
202 CPU
219 Memory
221 Register
231 Synchronous frame detection unit
232 Readout unit
233 Data frame detection unit
234 Despreading unit
235 Error determination unit
236 Output control unit
241 Known spread code generation unit
242 Fast Fourier transform unit
243 Inverse fast Fourier transform unit
244 Cross-correlation value calculation unit
245 Frame head position detection unit
251 Carrier frequency correction unit
252 Frame head position detection unit
253 Frame extraction unit
254 Parameter calculation unit
255 Frequency initial phase correction unit
256 Addition unit
257 Control unit
261 Known spread code generation unit
262 Fast Fourier transform unit
263 Inverse fast Fourier transform unit
264 Cross-correlation value calculation unit
265 Peak detection unit
271 Frame counter control unit
272 Mask control unit
273 Cross-correlation value maximum value detection unit
274 Peak setting unit
275 Rearrangement unit
281 Parameter provisional setting unit
282 Correlation value calculation unit
283 Parameter calculation unit
284 Control unit
285 Parameter determination unit
600 Computer

The invention claimed is:

1. A signal processing device, comprising:
circuitry configured to:
transmit data as a wireless signal for each frame;
repeat carrier sense of a frequency band in which the data is transmitted;
allow transmission of a data frame in the frequency band as the wireless signal in a case where the frequency band is vacant, wherein the frequency band is determined as vacant based on a result of the carrier sense; and
allow transmission of a synchronous frame in the frequency band as the wireless signal in a case where the data frame is transmitted a determined number of times within a first time period, wherein the synchronous frame is formed of information different from the data frame.

2. The signal processing device according to claim 1, wherein the circuitry is further configured to repeat the carrier sense every second time period shorter than the first time period.

3. The signal processing device according to claim 1, wherein the synchronous frame is formed of the information known by a reception side.

4. The signal processing device according to claim 1, wherein the synchronous frame is formed of a pseudo random number sequence determined in advance.

5. The signal processing device according to claim 1, wherein the circuitry is further configured to generate the synchronous frame.

6. The signal processing device according to claim 1, wherein the circuitry is further configured to generate the data frame.

7. The signal processing device according to claim 6, wherein the circuitry is further configured to:
generate a plurality of data frames based on a same data; and
transmit the plurality of data frames, wherein the same data is transmitted a plurality of number of times based on the transmission of the plurality of data frames.

8. The signal processing device according to claim 6, wherein the circuitry is further configured to rearrange the data in the data frame such that a portion known by a reception side of the data frame is evenly distributed in the data frame.

9. A signal processing method of a signal processing device, the method comprising:
transmitting, by circuitry of the signal processing device, a data as a wireless signal for each frame;
repeating, by the circuitry, carrier sense of a frequency band in which the data is transmitted;
transmitting, by the circuitry, a data frame in the frequency band as the wireless signal in a case where the frequency band is vacant, wherein the frequency band is determined as vacant based on a result of the carrier sense; and
transmitting, by the circuitry, a synchronous frame as the wireless signal in the frequency band in a case where the data frame is transmitted a determined number of times within a first time period, wherein the synchronous frame is formed of information different from the data frame.

10. A non-transitory computer-readable medium having stored thereon computer-executable instructions which when executed by a signal processing device cause the signal processing device to execute operations, the operations comprising:
transmitting, by circuitry of the signal processing device, data as a wireless signal for each frame;
repeating, by the circuitry, carrier sense of a frequency band in which the data is transmitted;
allowing, by the circuitry, transmission of a data frame in the frequency band as the wireless signal in a case where the frequency band is vacant, wherein the frequency band is determined as vacant based on a result of the carrier sense; and
allowing, by the circuitry, transmission of a synchronous frame in the frequency band as the wireless signal in a case where the data frame is transmitted a determined number of times within a first time period, wherein the synchronous frame is formed of information different from the data frame.

11. A signal processing device, comprising:
circuitry configured to:
receive a wireless signal of data for each frame;
store the received wireless signal, wherein the received wireless signal is stored as a reception signal;
detect a synchronous frame from the stored reception signal of a determined time or longer; and
detect a data frame from the stored reception signal of the determined time before the synchronous frame in a case where the synchronous frame is detected.

12. The signal processing device according to claim 11, wherein the synchronous frame is formed of information known by the signal processing device.

13. The signal processing device according to claim 11, wherein the synchronous frame is formed of a pseudo random number sequence determined in advance.

14. The signal processing device according to claim 11, wherein the circuitry is further configured to:
read out the stored reception signal of the determined time before the synchronous frame in a case where the synchronous frame is detected; and
detect the data frame from the read out reception signal of the determined time before the synchronous frame.

15. The signal processing device according to claim 14, wherein the circuitry is further configured to:
detect a head position of the data frame in the reception signal of the determined time before the synchronous frame;
cut out one-frame data; and
detect the data frame for each frame.

16. The signal processing device according to claim 14 wherein the circuitry is further configured to:
hold the read out reception signal of the determined time before the synchronous frame; and
detect the data frame from the held reception signal of the determined time before the synchronous frame.

17. The signal processing device according to claim 11, wherein the circuitry is further configured to:
multiply the detected data frame by a pseudo random number sequence; and
integrate the data frame to despread.

18. The signal processing device according to claim 11, wherein the circuitry is further configured to omit detection of the data frame for the reception signal of the determined time before the synchronous frame in a case where the synchronous frame is undetected.

19. A signal processing method of a signal processing device, the method comprising:
receiving, by a circuitry of the signal processing device, a wireless signal of data for each frame;
storing, by the circuitry, the received wireless signal as a reception signal;
detecting, by the circuitry, a synchronous frame from the stored reception signal of a determined time or longer; and
detecting, by the circuitry, a data frame from the stored reception signal of the determined time before the synchronous frame in a case where the synchronous frame is detected.

20. A non-transitory computer-readable medium having stored thereon computer-executable instructions which when executed by a signal processing device cause the signal processing device to execute operations, the operations comprising:
receiving, by a circuitry of the signal processing device, a wireless signal of data for each frame;
storing, by the circuitry, the received wireless signal, wherein the wireless signal is stored as a reception signal;
detecting, by the circuitry, a synchronous frame from the stored reception signal of a determined time or longer; and
detecting, by the circuitry, a data frame from the stored reception signal of the determined time before the synchronous frame in a case where the synchronous frame is detected.

* * * * *